(12) United States Patent
Kato

(10) Patent No.: US 8,024,165 B2
(45) Date of Patent: Sep. 20, 2011

(54) LOCUS-INTERFERENCE VERIFICATION METHOD, APPARATUS, AND RECORDING MEDIUM STORING LOCUS-INTERFERENCE VERIFICATION PROGRAM

(75) Inventor: Akira Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 571 days.

(21) Appl. No.: 12/032,127

(22) Filed: Feb. 15, 2008

(65) Prior Publication Data

US 2008/0201004 A1    Aug. 21, 2008

(30) Foreign Application Priority Data

Feb. 19, 2007    (JP) .................... 2007-037294
Nov. 30, 2007    (JP) .................... 2007-311413

(51) Int. Cl.
*G06G 7/48* (2006.01)
(52) U.S. Cl. ......................................................... 703/6
(58) Field of Classification Search ... 703/6; 414/140.3, 414/140.4, 142.6, 14.72
See application file for complete search history.

(56) References Cited

U.S. PATENT DOCUMENTS

2007/0050115 A1 * 3/2007 Discenzo et al. ............... 701/50

FOREIGN PATENT DOCUMENTS

JP    2004-348452    12/2004

OTHER PUBLICATIONS

T. Miyoshi, K. Tsuchida, K. Terashima, "Obstacle Avoidance Control for Overhead Crane with Rotary Motion of Load", SICE Annual Conference in Fukui, Aug. 4-6, 2003 pp. 2277-2282.*
Douglas Downing, Ph.D., "Dictionary of Mathematics Terms", copyright 1987, Title page, Table of Contents, & pp. 116 & 117.*

* cited by examiner

*Primary Examiner* — Dwin M Craig
(74) *Attorney, Agent, or Firm* — Staas & Halsey LLP

(57) ABSTRACT

A locus-interference verification apparatus and method including generating locus models for the respective objects and storing the locus models, where each locus model represents a locus of at least a position where a maximum size is obtained and is generated by virtually moving model data of a corresponding object in accordance with the data regarding the locus of the corresponding object. The data regarding the locus is stored in a locus data storage and the model data is stored in a model data storage for each of the objects, and an intersection calculation is performed for all of the combinations of the locus models stored in the locus model data storage, and presence/absence of an overlapping model between the locus models is determined, where the overlapping model indicates an occurrence of an interference during a movement and/or a rotation of the objects.

9 Claims, 33 Drawing Sheets

VERTEX (X, Y, Z)

| PART NAME | XX1 | | |
|---|---|---|---|
| REFERENCE COORDINATES | X | Y | Z |
| VECTOR X1 | X COMPONENT | Y COMPONENT | Z COMPONENT |
| VECTOR Y1 | X COMPONENT | Y COMPONENT | Z COMPONENT |
| VECTOR Z1 | X COMPONENT | Y COMPONENT | Z COMPONENT |
| LENGTH | z1 | | |
| WIDTH | x1 | | |
| HEIGHT | y1 | | |

| PART NAME | PHASE 1 | PHASE 2 | PHASE 3 | PHASE 4 | PHASE 5 |
|---|---|---|---|---|---|
| MOVEMENT REFERENCE POINT | MOVEMENT REFERENCE 1 (X, Y, Z) | — | MOVEMENT REFERENCE 1 (X, Y, Z) | — | MOVEMENT REFERENCE 2 (X, Y, Z) |
| DIRECTION VECTOR | DIRECTION VECTOR 1 | — | DIRECTION VECTOR 2 | — | DIRECTION VECTOR 4 |
| DISTANCE | DISTANCE 1 | — | DISTANCE 2 | DISTANCE 3 | DISTANCE 4 |
| ROTATION REFERENCE | — | ROTATION REFERENCE 1 | — | ROTATION REFERENCE 2 | — |
| ROTATIONAL AXIS | — | DIRECTION VECTOR 1 | — | — | — |
| ACCUMULATED DISTANCE | K1 | — | K2 | K3 | K4 |
| TIME | n1 SEC | n2 SEC | n3 SEC | n4 SEC | n5 SEC |

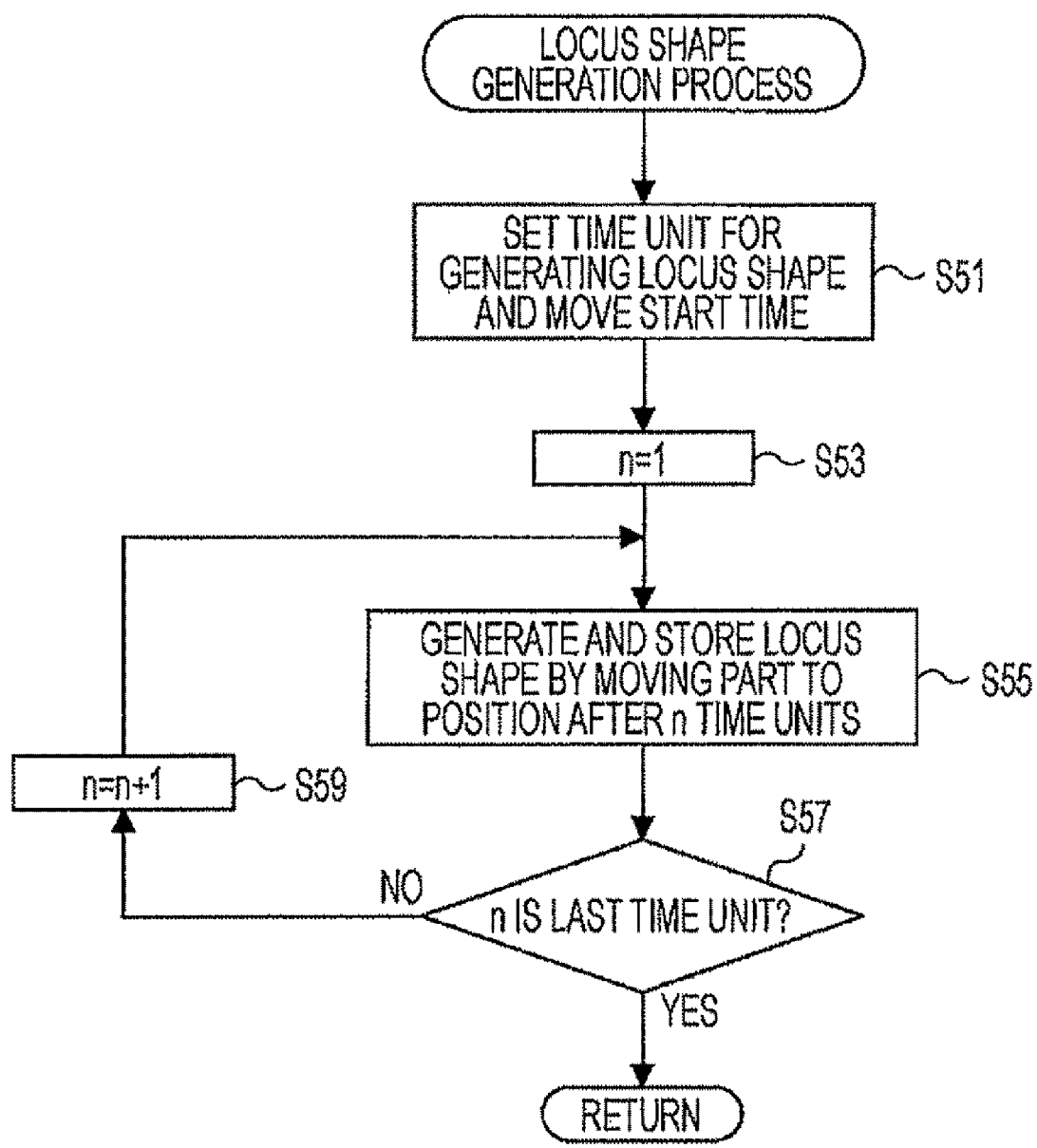

VERTEX (X, Y, Z)

| PART NAME | XX1 | | | |
|---|---|---|---|---|
| REFERENCE COORDINATES | X | Y | Z | |
| VECTOR X1 | X COMPONENT | Y COMPONENT | Z COMPONENT | |
| VECTOR Y1 | X COMPONENT | Y COMPONENT | Z COMPONENT | |
| VECTOR Z1 | X COMPONENT | Y COMPONENT | Z COMPONENT | |
| LENGTH | z1 | | | |
| WIDTH | x1 | | | |
| HEIGHT | y1 | | | |
| MOVE START TIME | HR:MIN:SEC | | | |
| LOCUS SHAPE NAME | XXXX01 | XXXX02 | XXXX03 | · · · · |

FIG. 8C

| LOCUS SHAPE NAME | XXXX01 | | |
|---|---|---|---|
| REFERENCE COORDINATES | X | Y | Z |
| VECTOR X1 | X COMPONENT | Y COMPONENT | Z COMPONENT |
| VECTOR Y1 | X COMPONENT | Y COMPONENT | Z COMPONENT |
| VECTOR Z1 | X COMPONENT | Y COMPONENT | Z COMPONENT |
| LENGTH | zz1 | | |
| WIDTH | xx1 | | |
| HEIGHT | yy1 | | |
| TIME SLICE NUMBER | 1 | | |
| ARRIVAL TIME | HR:MIN:SEC | | |

FIG. 8D

| LOCUS SHAPE NAME | XXXX02 | | |
|---|---|---|---|
| REFERENCE COORDINATES | X | Y | Z |
| VECTOR X1 | X COMPONENT | Y COMPONENT | Z COMPONENT |
| VECTOR Y1 | X COMPONENT | Y COMPONENT | Z COMPONENT |
| VECTOR Z1 | X COMPONENT | Y COMPONENT | Z COMPONENT |
| LENGTH | zz1 | | |
| WIDTH | xx1 | | |
| HEIGHT | yy1 | | |
| TIME SLICE NUMBER | 2 | | |
| ARRIVAL TIME | HR:MIN:SEC | | |

FIG. 8E

| LOCUS SHAPE NAME | XXXX03 | | |
|---|---|---|---|
| REFERENCE COORDINATES | X | Y | Z |
| VECTOR X1 | X COMPONENT | Y COMPONENT | Z COMPONENT |
| VECTOR Y1 | X COMPONENT | Y COMPONENT | Z COMPONENT |
| VECTOR Z1 | X COMPONENT | Y COMPONENT | Z COMPONENT |
| LENGTH | zz1 | | |
| WIDTH | xx1 | | |
| HEIGHT | yy1 | | |
| TIME SLICE NUMBER | 3 | | |
| ARRIVAL TIME | HR:MIN:SEC | | |

FIG. 20A

| PART NAME | XX1 | XX2 | XX3 | XX4 |

FIG. 20B

| START TIME | HR:MIN:SEC | HR:MIN:SEC | HR:MIN:SEC | HR:MIN:SEC |
|---|---|---|---|---|
| ASSEMBLY PROCEDURE | 1 | 2 | 1 | 1 |
| PART NAME | XX1 | XX2 | XX3 | XX4 |

FIG. 24

| PART NAME | A01 | | | | |
|---|---|---|---|---|---|
| | PHASE 1 | PHASE 2 | PHASE 3 | PHASE 4 | PHASE 5 |
| MOVEMENT REFERENCE POINT | MOVEMENT REFERENCE 1 (X, Y, Z) | — | MOVEMENT REFERENCE 1 (X, Y, Z) | — | MOVEMENT REFERENCE 2 (X, Y, Z) |
| DIRECTION VECTOR | DIRECTION VECTOR 1 | — | DIRECTION VECTOR 2 | — | DIRECTION VECTOR 4 |
| DISTANCE | DISTANCE 1 | — | DISTANCE 2 | DISTANCE 3 | DISTANCE 4 |
| ROTATION REFERENCE | — | ROTATION REFERENCE 1 (X, Y, Z) | — | ROTATION REFERENCE 2 (X, Y, Z) | — |
| ROTATIONAL AXIS | — | DIRECTION VECTOR 1 | — | DIRECTION VECTOR 3 | — |
| ROTATION ANGLE | — | 360° | — | 90° | — |
| ACCUMULATED DISTANCE | K1 | — | K2 | K3 | K4 |
| TIME | n1 SEC | n2 SEC | n3 SEC | n4 SEC | n5 SEC |
| LOCUS SHAPE NAME | LOCUS 01 | LOCUS 02 | LOCUS 03 | LOCUS 04 | LOCUS 05 |

FIG. 28

| PART NAME | a | | | | |
|---|---|---|---|---|---|
| | PHASE 1 | PHASE 2 | PHASE 3 | PHASE 4 | PHASE 5 |
| MOVEMENT REFERENCE POINT | MOVEMENT REFERENCE 11 (X, Y, Z) | MOVEMENT REFERENCE 12 (X, Y, Z) | — | — | MOVEMENT REFERENCE 13 (X, Y, Z) |
| DIRECTION VECTOR | DIRECTION VECTOR 11 | DIRECTION VECTOR 12 | — | — | DIRECTION VECTOR 13 |
| DISTANCE | DISTANCE 11 | DISTANCE 12 | DISTANCE 13 | — | DISTANCE 14 |
| ROTATION REFERENCE | — | — | ROTATION REFERENCE 11 (X, Y, Z) | ROTATION REFERENCE 12 (X, Y, Z) | — |
| ROTATIONAL AXIS | — | — | DIRECTION VECTOR 13 | DIRECTION VECTOR 13 | — |
| ROTATION ANGLE | — | — | 90° | 360° | — |
| ACCUMULATED DISTANCE | K11 | K12 | K13 | — | K14 |
| TIME | n11 SEC | n12 SEC | n13 SEC | n14 SEC | n15 SEC |
| LOCUS SHAPE NAME | LOCUS 11 | LOCUS 12 | LOCUS 13 | LOCUS 14 | LOCUS 15 |

FIG. 30

| PART NAME | b | | | | |
|---|---|---|---|---|---|
| | PHASE 1 | PHASE 2 | PHASE 3 | PHASE 4 | PHASE 5 |
| MOVEMENT REFERENCE POINT | — | MOVEMENT REFERENCE 21 (X, Y, Z) | — | — | MOVEMENT REFERENCE 13 (X, Y, Z) |
| DIRECTION VECTOR | — | DIRECTION VECTOR 21 | — | — | DIRECTION VECTOR 23 |
| DISTANCE | — | DISTANCE 21 | DISTANCE 22 | — | DISTANCE 23 |
| ROTATION REFERENCE | — | — | ROTATION REFERENCE 11 (X, Y, Z) | ROTATION REFERENCE 12 (X, Y, Z) | — |
| ROTATIONAL AXIS | — | — | DIRECTION VECTOR 13 | DIRECTION VECTOR 13 | — |
| ROTATION ANGLE | — | — | 90° | 360° | — |
| ACCUMULATED DISTANCE | — | K21 | K22 | — | K23 |
| TIME | n11 SEC | n12 SEC | n13 SEC | n14 SEC | n15 SEC |
| LOCUS SHAPE NAME | — | LOCUS 21 | LOCUS 22 | LOCUS 23 | LOCUS 24 |

FIG. 32

| PART NAME | c | | | | |
|---|---|---|---|---|---|
| | PHASE 1 | PHASE 2 | PHASE 3 | PHASE 4 | PHASE 5 |
| MOVEMENT REFERENCE POINT | — | — | MOVEMENT REFERENCE 31 | — | — |
| DIRECTION VECTOR | — | — | — | — | — |
| DISTANCE | — | — | DISTANCE 31 | — | — |
| ROTATION REFERENCE | — | — | ROTATION REFERENCE 11 (X, Y, Z) | — | — |
| ROTATIONAL AXIS | — | — | DIRECTION VECTOR 13 | — | — |
| ROTATION ANGLE | — | — | 90° | — | — |
| ACCUMULATED DISTANCE | — | — | K31 | — | — |
| TIME | n11 SEC | n12 SEC | n13 SEC | n14 SEC | n15 SEC |
| LOCUS SHAPE NAME | — | — | LOCUS 31 | — | — |

LOCUS-INTERFERENCE VERIFICATION METHOD, APPARATUS, AND RECORDING MEDIUM STORING LOCUS-INTERFERENCE VERIFICATION PROGRAM

CROSS-REFERENCE TO RELATED APPLICATIONS

This application is related to and claims the benefit of priority from Japanese Patent Application No. 2007-311413, filed on Nov. 30, 2007 and Japanese Patent Application No. 2007-037294, filed on Feb. 19, 2007, the entire contents of which are incorporated herein by reference.

BACKGROUND

1. Field

The present invention relates to a technique for virtually verifying presence/absence of an interference on a movement of an object or a rotation locus.

SUMMARY

The disclosed locus-interference verification apparatus and method comprises accepting an input of data regarding loci generated when a plurality of objects to be analyzed are moved or rotated and storing the data in a locus data storage, generating locus models corresponding to the objects and storing the locus models in a locus model data storage.

Each locus model represents a locus of at least a position where a maximum size is obtained and is generated by virtually moving model data of a corresponding object in accordance with the data regarding the locus of the corresponding object, the data regarding the locus is stored in the locus data storage and the model data being stored in a model data storage for each of the objects.

The disclosed apparatus and method includes performing an intersection calculation for all of the combinations of the locus models stored in the locus model data storage, and determining an occurrence of an overlapping model between the locus models, where the overlapping model indicating an occurrence of interference during a movement or a rotation of the objects.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 6 illustrates an example illustrating data stored in a locus data storage;

FIG. 7 is a flowchart illustrating a locus-shape generation process;

FIGS. 8C, 8D and 8E illustrate examples of locus model data;

FIG. 20A is a diagram illustrating an example of parts that can be simultaneously assembled;

FIG. 20B is a diagram illustrating an example of an assembly procedure;

FIG. 24 illustrates an example of locus data according to a modification;

FIG. 28 illustrates an example of locus data of an arm;

FIG. 30 illustrates an example of locus data of a the box;

FIG. 32 illustrates an example of locus data of a crane head;

DETAILED DESCRIPTION OF THE EMBODIMENTS

Figure 1:
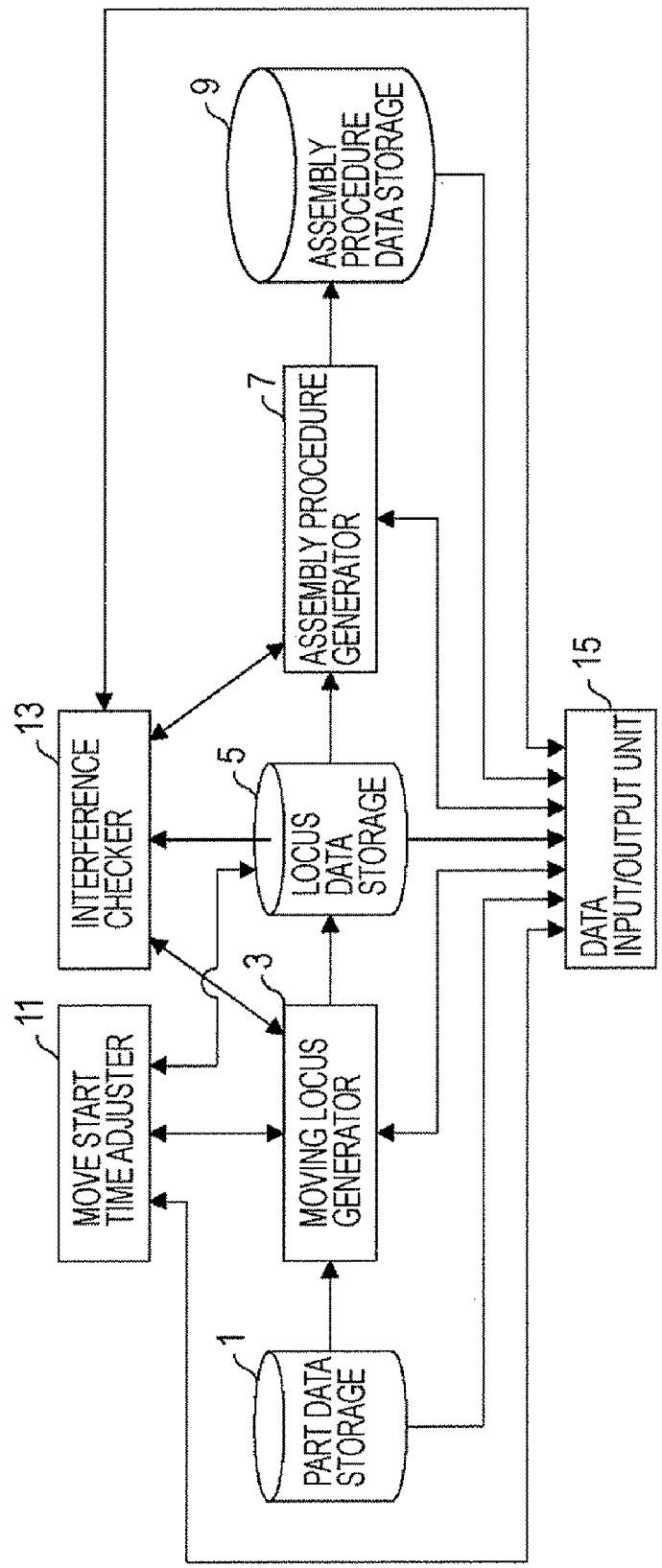
FIG. 1 illustrates a system configuration.

Reference will now be made in detail to the embodiments, examples of which are illustrated in the accompanying drawings, wherein like reference numerals refer to the like elements throughout. The embodiments are described below to explain the present invention by referring to the figures.

When, for example, a plurality of parts are simultaneously assembled using a plurality of robots, there is a possibility that the parts will interfere with each other during assembly even if no interference occurs between the parts after the assembly. The parts cannot be simultaneously assembled by the robots unless this problem is solved. If the problem can be solved, productivity can be greatly increased by simultaneously assembling the parts. However, it takes a long time to verify and it is not efficient to verify the assembly process by actually moving and assembling the parts.

The above-described problem occurs not only when parts are assembled but also when objects are moved or rotated by a plurality of mechanical devices.

FIG. 1 illustrates a functional block diagram of an assembly verification apparatus according to an embodiment. The assembly verification apparatus includes a part data storage 1 that stores model data of parts to be analyzed, a moving locus generator (unit) 3 that receives an input regarding a moving locus of a part and generates locus model data, a locus data storage 5 that stores the locus model data; an interference checker (unit) 13 that operates in association with the moving locus generator 3 to perform an interference check process using data stored in the locus data storage 5, a move-start-time adjuster (unit) 11 that operates in association with the moving locus generator 3 to perform a move-start-time adjusting process using the data stored in the locus data storage 5. As shown in FIG. 1, the assembly verification apparatus may include an assembly procedure generator (unit) 7 that generates an assembly procedure and the like using the data stored in the locus data storage 5, an assembly procedure data storage 9 that stores a process result obtained by the assembly procedure generator 7, and a data input/output unit 15 enabled to display data stored in the above-mentioned data storages in association with the above-mentioned process units. The interference checker 13 also operates in association with the assembly procedure generator 7. Operations illustrated in association with FIG. 1 may be implemented via hardware, software, or combination thereof as explained herein.

Figures 2A, 2B:
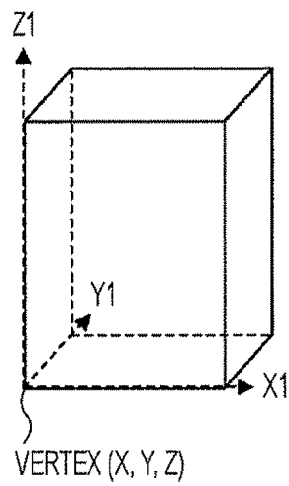
FIG. 2A illustrates an example illustrating a part.
FIG. 2B illustrates an example illustrating data stored in a part data storage.

An example of data stored in the part data storage 1 will be described with reference to FIGS. 2A and 2B. When, for example, a part has a rectangular parallelepiped shape as shown in FIG. 2A, data shown in FIG. 2B, for example, is stored in the part data storage 1. More specifically, the stored data includes a part name (data uniquely identifying the part); reference coordinates (X, Y, Z); X, Y, and Z components of vector X1; X, Y, and Z components of vector Y1; X, Y, and Z components of vector Z1; a dimension in a length direction (Z1 direction); a dimension in a width direction (X1 direction); and a dimension in a height direction (Y1 direction). The part data storage 1 stores a plurality of sets of model data for parts to be analyzed.

Figure 3A:
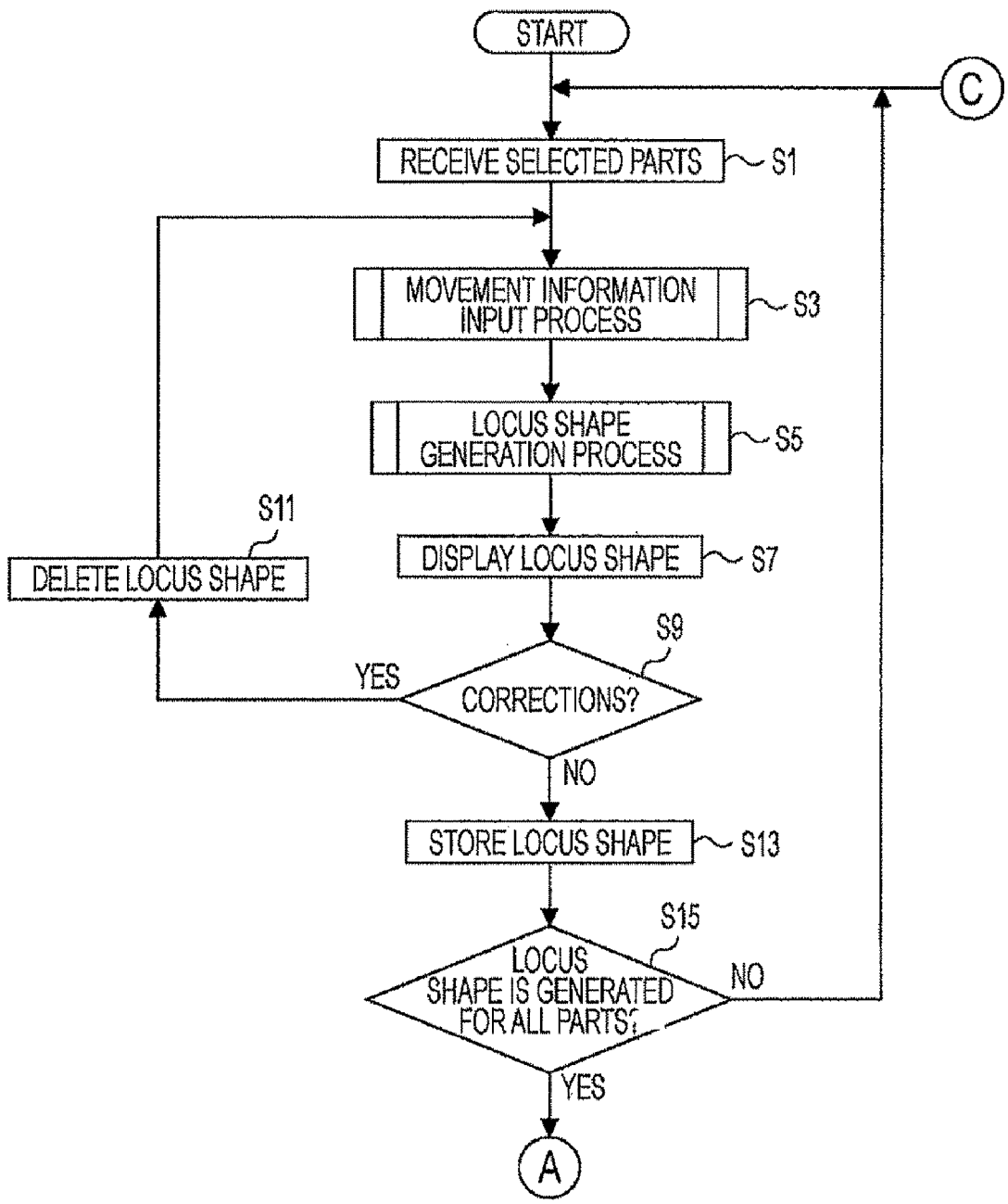
FIG. 3A is a flowchart of a first part of a main process flow.

Next, processes performed by the assembly verification apparatus shown in FIG. 1 will be described with reference to FIGS. 3A to 21. First, a user instructs the data input/output unit 15 to display model data of parts stored in the part data storage 1 on a display device, and selects parts to be subjected to the analysis. The data input/output unit 15 receives the part selection input from the user (operation S1 in FIG. 3A) and outputs identification data of the selected parts to the moving locus generator 3.

The moving locus generator 3 receives the identification data of the parts from the data input/output unit 15, reads the identification data of the parts from the part data storage 1, and carries out a movement information input process in operation S3. The movement information input process will be described below with reference to FIGS. 4 to 6. First, a moving locus of a part during assembly thereof will be described with reference to FIG. 4. In phase 1, a part identified by part name A01, for example, is translated along direction vector 1 by distance 1 with movement reference 1 serving as a reference point. Then, in phase 2, the part is rotated around rotation reference 1 by 90°. In phase 3, the part is translated along direction vector 2 by distance 2 with the movement reference 1 serving as a reference point. In phase 4, the part is rotated around rotation reference 2 by 90° so as to change a moving direction thereof. For example, a part is rotated such that the movement reference 1 is moved by distance 3. In phase 5, the part is translated along direction vector 4 by distance 4 with movement reference 2 serving as a reference point. The locus data for moving the part as described above is input in accordance with the process flow shown in FIG. 5 described below is detail.

First, the moving locus generator 3 causes the data input/output unit 15 to display a screen prompting the user to select one of translation, rotation around an axis, and normal rotation. When, for example, the user selects translation (YES in operation S21 in FIG. 5), the moving locus generator 3 causes the data input/output unit 15 to show a display prompting the user to input a movement reference point. A movement reference point input by the user is received and stored in the locus data storage 5 in operation S23. Then, a display prompting the user to input a direction vector is shown, and a direction vector input by the user is received and stored in the locus data storage 5 in operation S25. Then, a display prompting the user to input a distance and a time necessary for moving the part by that distance is shown, and a distance and a time input by the user are received and stored in the locus data storage 5 in operation S27. Then, an accumulated distance for a current phase is calculated and stored in the locus data storage 5 in operation S43.

Next, the user is queried to determine whether or not input is finished (completed). If the user instructs that the input is finished (YES in operation S45), the movement information input process is finished. If the user does not instruct that the input is finished (NO in operation S45), the phase is switched to the next phase (i.e., column is changed in data storage table) in operation S47. Then, the control process returns to operation S21 through terminal B.

If the user does not select translation (NO in operation S21) and selects rotation around an axis (YES in operation S29), the moving locus generator 3 causes the data input/output unit 15 to show a display prompting the user to input a rotation reference point. A rotation reference point input by the user is received and stored in the locus data storage 5 in operation S31. Then, a display prompting the user to input a rotational axis is shown, and a rotational axis input by the user is received and stored in the locus data storage 5 in operation S33. Then, a display prompting the user to input a time necessary for the rotation is shown, and a time input by the user is received and stored in the locus data storage 5 in operation S35. Then, the control process proceeds to operation S43.

If the user does not select rotation around an axis (NO in operation S29) and selects a normal rotation (NO in operation S29), the moving locus generator 3 causes the data input/output unit 15 to show a display prompting the user to input a rotation reference point. A rotation reference point input by the user is received and stored in the locus data storage 5 in operation S37. Then, a display prompting the user to input a distance is shown, and a distance input by the user is received and stored in the locus data storage 5 in operation S39. Then, a display prompting the user to input a time necessary for the rotation is shown, and a time input by the user is received and stored in the locus data storage 5 in operation S41. Then, the control process proceeds to operation S43.

According to the above-described process, a table as shown in FIG. 6 is generated and stored in the locus data storage 5. The table shown in FIG. 6 corresponds to the movement shown in FIG. 4. More specifically, since the part is translated in phase 1, a movement reference point, a direction vector, a distance, an accumulated distance, and a time are registered for phase 1. In addition, since the part is rotated around an axis in phase 2, a rotation reference point, a rotational axis, and a time are registered for phase 2. In addition, since the part is translated in phase 3, a movement reference point, a direction vector, a distance, an accumulated distance, and a time are registered for phase 3. In addition, since normal rotation of the part is performed in phase 4, a distance, a rotation reference point, an accumulated distance, and a time are registered for phase 4. In addition, since the part is translated in phase 5, a movement reference point, a direction vector, a distance, an accumulated distance, and a time are registered for phase 5.

In the interference check process, which will be described below, to easily determine whether or not an interference will occur, a circumscribed column around a rotational axis is generated as a locus shape for rotation around an axis, and no rotating angle is registered. In addition, a circumscribed sphere centered on a rotation reference point is generated as a locus shape for normal rotation, and no rotating angle is registered.

Referring to the flowchart shown in FIG. 3A again, the moving locus generator 3 performs a locus-shape generation process using the data stored in the locus data storage 5 and the data stored in the part data storage 1 in operation S5. The locus-shape generation process will be described in detail with reference to FIGS. 7 to 10.

First, in operation S51, the moving locus generator 3 sets a time unit for generating a locus shape and a move start time in accordance with value(s) designated by a user or default value(s) of a system (for example, apparatus shown in FIG. 1). The time unit for generating a locus shape is set to, for example, 1 second. Then, n is initialized to 1 in operation S53. Then, the part is moved or rotated to a position corresponding to the time after lapse of n time units, thereby generating a locus shape (locus model data) corresponding to the movement from the initial position to a position after the movement. The thus-generated locus model data is stored in a storage device, such as a main memory, in operation S55.

Figures 8A, 8B:
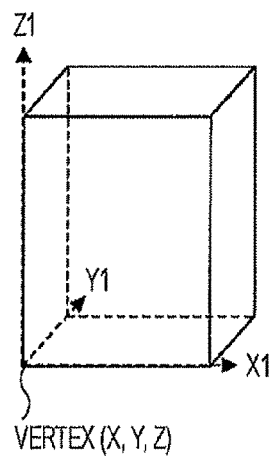
FIG. 8A illustrates an example illustrating a part.
FIG. 8B illustrates an example illustrating part data.

When, for example the part has a rectangular parallelepiped shape as shown in FIG. 8A, data shown in FIGS. 8B to 8E are stored in the locus data storage 5. The part shown in FIG. 8A is similar to the part having a rectangular parallelepiped shape shown in FIG. 2A. The model data shown in FIG. 8B is used as base data and is similar to the data shown in FIG. 2B except a move start time and a locus shape name (or a pointer for the locus model data) are added at the bottom rows. FIG. 8C shows a first locus model data. The first locus model data shows a locus shape of a movement from an initial position to a position corresponding to a time after lapse of, for example, 1 second. In the example shown in FIG. 8C, a locus shape name, data representing the shape (reference coordinates, components of vectors X1, Y1, and Z1, and dimensions in length, width, and height directions), a time slice number (i.e., a number indicating a temporal order of the locus model), and an arrival time are registered. The data representing the shape may have a complex data structure as necessary. FIG. 8D shows a second locus model data. The second locus model data shows a locus shape of a movement from an initial position to a position corresponding to a time after lapse of, for example, 2 seconds. The data structure is similar to that shown in FIG. 8C. The time slice number is incremented to '2' and the arrival time is updated to 2 seconds. FIG. 8E shows third locus model data. The third locus model data shows a locus shape of a movement from an initial position to a position corresponding to a time after lapse of, for example, 3 seconds. The data structure is similar to that shown in FIG. 8C. The time slice number is incremented to '3' and the arrival time is updated to 3 seconds.

Figure 4:
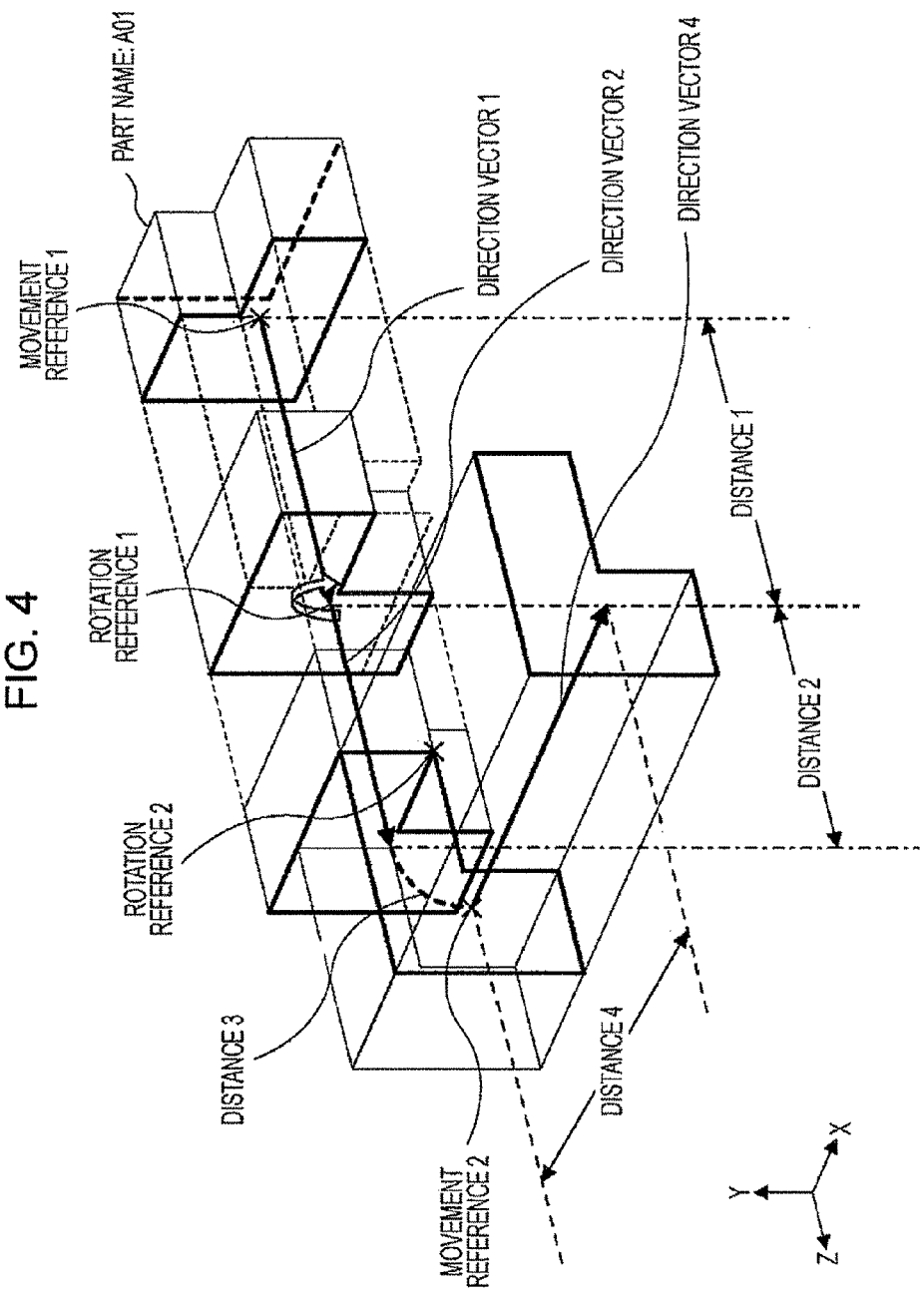
FIG. 4 illustrates locus data and a locus shape.
Figure 9:
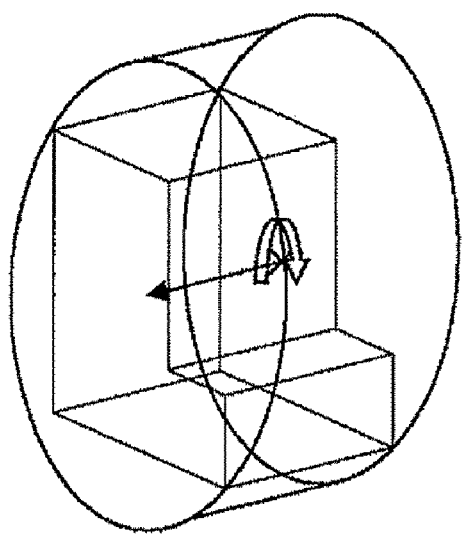
FIG. 9 is a diagram illustrating a locus shape in a case of a rotation around an axis.
Figure 10:
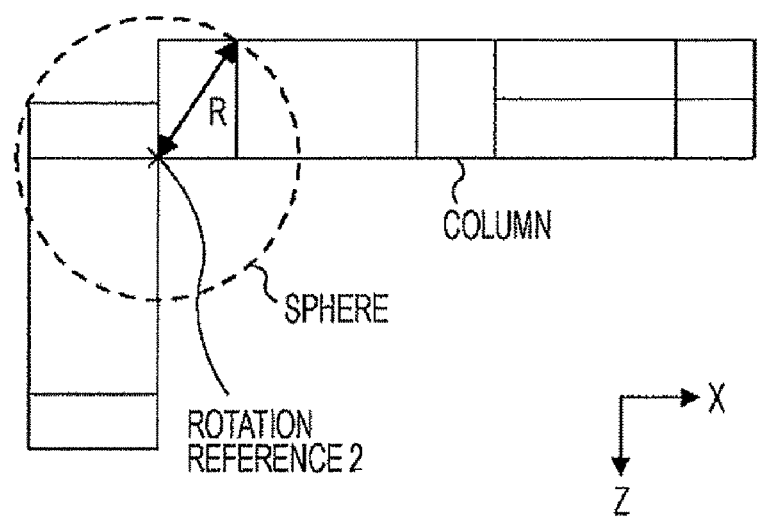
FIG. 10 is a top view of an example illustrating a locus shape.

As described above, it is not necessary to use a precise locus shape for checking whether or not an interference will occur. More specifically, in the case of a rotation around an axis, a rotating angle is not required to be taken into account. Referring to FIG. 4, when the part is rotated around the direction vector 1 with the rotation reference 1 fixed at the center, a circumscribed column is used as the locus shape, as shown in FIG. 9. In addition, referring to FIG. 4, when the part is rotated with the rotation reference 2 fixed at the center, a circumscribed sphere is used as the locus shape, as shown in FIG. 10 which shows the locus shape viewed in the Y-axis direction. Accordingly, a locus shape can be easily generated and an occurrence of interference can be checked with a sufficient margin.

Referring to FIG. 7 again, the moving locus generator 3 checks whether or not n is the last time unit in operation S57. The last time unit is determined on the basis of an expected assembly completion time set in advance by a user. For example, the last time unit is determined on the basis of a time at which a robot holding a part returns to an initial position. If it is determined that n is not the last time unit, n is incremented by 1 in operation S59 and the control process returns to operation S55. If it is determined that n is the last time unit, the process is finished.

According to the above-described process, the locus model data is obtained in operations of a time unit for each part to be analyzed.

Referring to FIG. 3A again, in operation S7, the moving locus generator 3 causes the data input/output unit 15 to display the locus shape to the user using the locus model data stored in the storage device, such as a main memory. For example, a screen as shown in FIG. 4 is displayed on the display device, allowing the user to check the input.

Then, in operation S9, the moving locus generator 3 causes the data input/output unit 15 to show a display asking the user whether or not to make a correction. If the user instructs to make a correction, the locus shape (i.e., the locus model data) stored in the storage device, such as a main memory, is deleted in operation S11. Then, the process returns to operation S3.

If the user instructs not to make a correction, the locus shape (i.e., the locus model data) is stored in the locus data storage 5 in operation S13. Then, the moving locus generator 3 causes the data input/output unit 15 to ask or prompt the user to indicate whether or not the locus shape is generated for all of the parts in operation S15. If it is necessary to process another part to be analyzed, the user inputs an instruction designating the next part to the data input/output unit 15 and the process returns to operation S1. If the locus shape is generated for all of the parts to be analyzed, the user inputs an instruction to start the interference check process to the data input/output unit 15 and the process proceeds to FIG. 3B through terminal A.

Figure 3B:
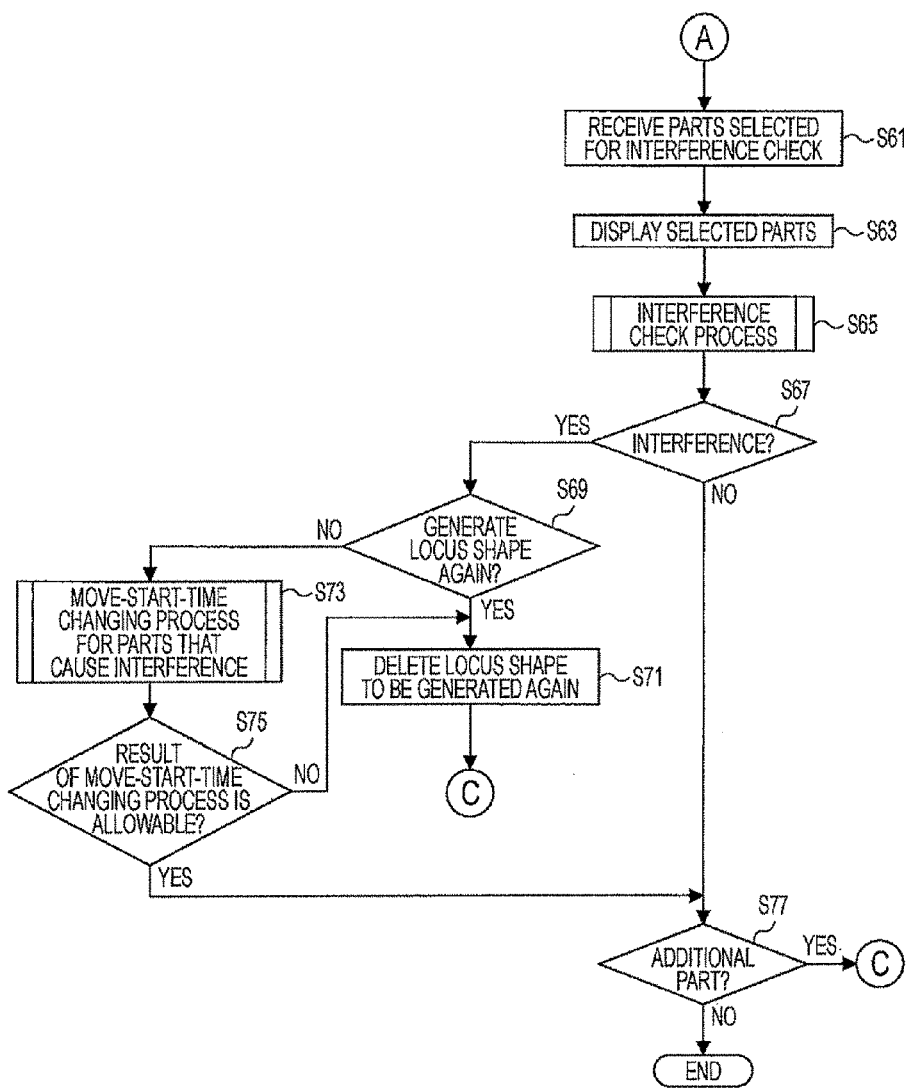
FIG. 3B is a flowchart illustrating a second part of a main process flow.

Next, the moving locus generator 3 causes the data input/output unit 15 to show a display prompting the user to select parts to be subjected to an interference check from the parts whose locus shapes are generated, and receives the selection input of part(s) to be subjected to the interference check from the user (operation S61 in FIG. 3B). Then, in operation S63, the moving locus generator 3 causes the data input/output unit 15 to display the parts to be subjected to the interference check that are selected by the user and stored in the locus data storage 5. Then, the moving locus generator 3 causes the interference checker 13 to carry out the interference check process in operation S65. The interference check process will be described in detail with reference to FIGS. 11 to 13.

Figure 11:
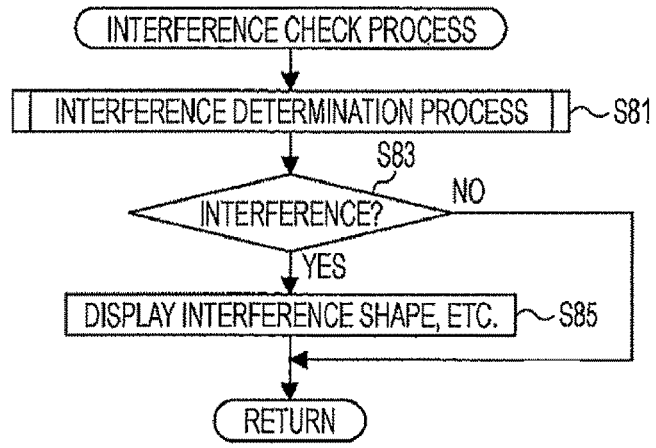
FIG. 11 is a flowchart illustrating an interference check process.

First, the interference checker 13 performs an interference determination process in operation S81 (FIG. 11). The interference determination process will be described in detail with reference to FIGS. 12 and 13.

Figure 12:
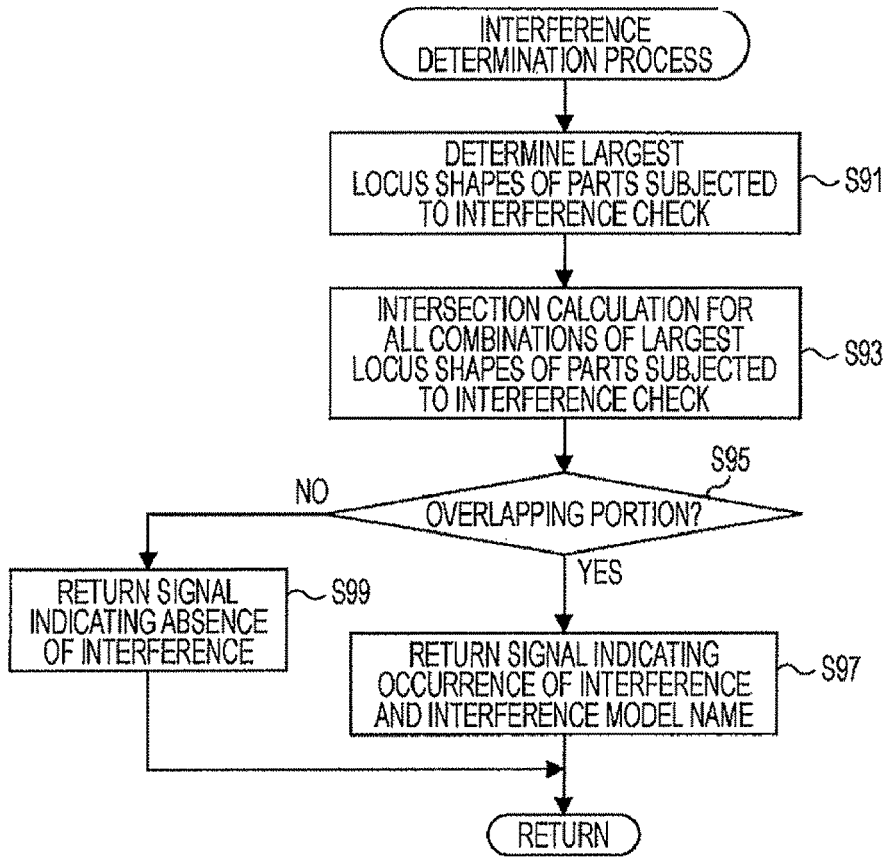
FIG. 12 is a flowchart illustrating an interference determination process.

First, the interference checker 13 determines a largest locus shape for all parts to be subjected to the interference check in operation S91 (FIG. 12). For example, if a robot used for assembling a part moves along the same locus before and after the assembly, the locus model data representing a locus from the initial position to the assembly position is used. In special cases where the robot used for assembling the part does not move along the same locus before and after the assembly, a largest locus shape is determined.

Figure 13:
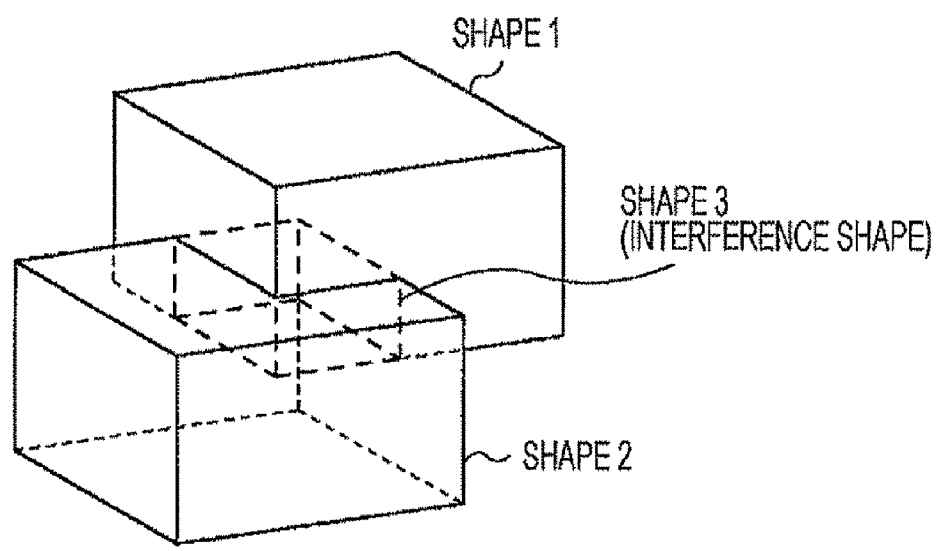
FIG. 13 is a diagram illustrating an interference shape.

Then, in operation S93, the interference checker 13 carries out an intersection calculation for all combinations of the largest locus shapes of the parts to be subjected to the interference check. FIG. 13 shows an example of an intersection calculation. In FIG. 13, there is an interference between shapes 1 and 2, so that shape 3 (interference shape) is obtained as a result of the intersection calculation of the shapes 1 and 2. If there is no interference, no interference shape is obtained.

If there is an overlapping portion, that is, if an interference shape is obtained (YES in operation S95 in FIG. 12), a signal (message) indicating an occurrence of an interference and an interference model name are returned to the original process in operation S97. The interference model name includes names of two locus shapes used in subsequent processes. For example, in the example shown in FIG. 13, "(shape 1)*(shape 2)" is used as the interference model name. The interference model name and the interference shape (i.e., interference model data) are stored in the locus data storage 5. Then, the process returns to the original process.

If there is no overlapping portion, that is, if no interference shape is obtained (NO in operation S95 FIG. 12), a signal (message) indicating an absence of interference is returned to the original process in operation S99. Then, the process returns to the original process.

According to the above-described process, parts whose assembly paths have a problem can be determined.

Referring to FIG. 11 again, the interference checker 13 checks whether or not there is an interference in operation S83. If there is an interference, the data input/output unit 15 displays the interference model name and the interference shape stored in the locus data storage 5 in operation S85. Then, the process returns to the original process. If there is no interference, the process returns to the original process.

According to the above-described process, if there is an interference, the user recognizes that there is a problem in the locus data input by the user.

Referring to FIG. 3B again, in operation S67, the moving locus generator 3 determines whether or not the interference checker 13 has determined that there is an interference. If there is an interference, the moving locus generator 3 causes the data input/output unit 15 to show a display prompting the user to select whether to generate a locus shape again or to change the move start time of a part that causes the interference. If the user selects to generate a locus shape again (YES in operation S69), the data input/output unit 15 shows a display for allowing the user to select the locus shape to be generated again or a part corresponding to the locus shape.

Then, in operation S71, the locus shape to be generated again is deleted from the locus data storage 5 in accordance with the selection by the user. Then, the process returns to operation S1 in FIG. 3A through terminal C.

If the user selects to change the move start time of the part that causes the interference (NO in operation S69), the move-start-time adjuster 11 performs a move-start-time changing process for the part that causes interference in operation S73. The move-start-time changing process will be described with reference to FIGS. 14 to 18.

Figure 14:
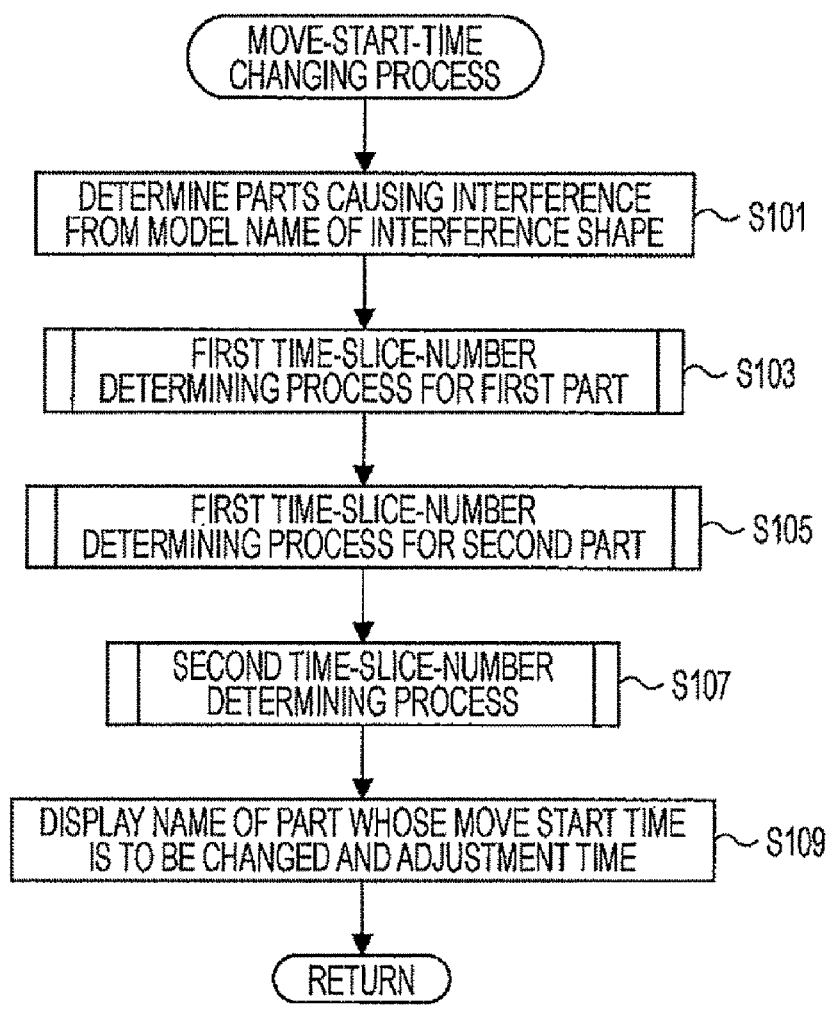
FIG. 14 is a flowchart illustrating a move-start-time changing process for part(s) that cause interference.

First, the move-start-time adjuster 11 determines two parts that interfere with each other on the basis of the model name of the interference shape (operation S101 in FIG. 14). As described above, the model name of the interference shape is set to (locus shape name)*(locus shape name). Therefore, the two locus shape names are determined, and the part names are determined from the locus shape names. Then, of the two parts, a first part is subjected to a first time-slice-number determining process in operation S103. The first time-slice-number determining process will be described with reference to FIG. 15.

First, the move-start-time adjuster 11 initializes n to 1 in operation S111. Then, the model data of the locus shape corresponding to the $n^{th}$ time slice and the model data of the interference shape are read from the locus data storage 5. Then, an intersection calculation of the locus shape corresponding to the $n^{th}$ time slice and the interference shape is performed in operation S113. Similar to operation S93 (FIG. 12), the intersection calculation is performed for the interference check. In operation S113 (FIG. 15), the same shape as the interference shape is obtained as a result of the intersection calculation if there is an interference. If there is no interference (NO in operation S115), n is incremented by 1 in operation S117 and the process returns to operation S113. Thus, the part is moved in operations of one time unit to determine the timing at which the part arrives at the position of interference. If there is an interference (YES in operation S115), n is set as a parameter BON in operation S119.

Figure 15:
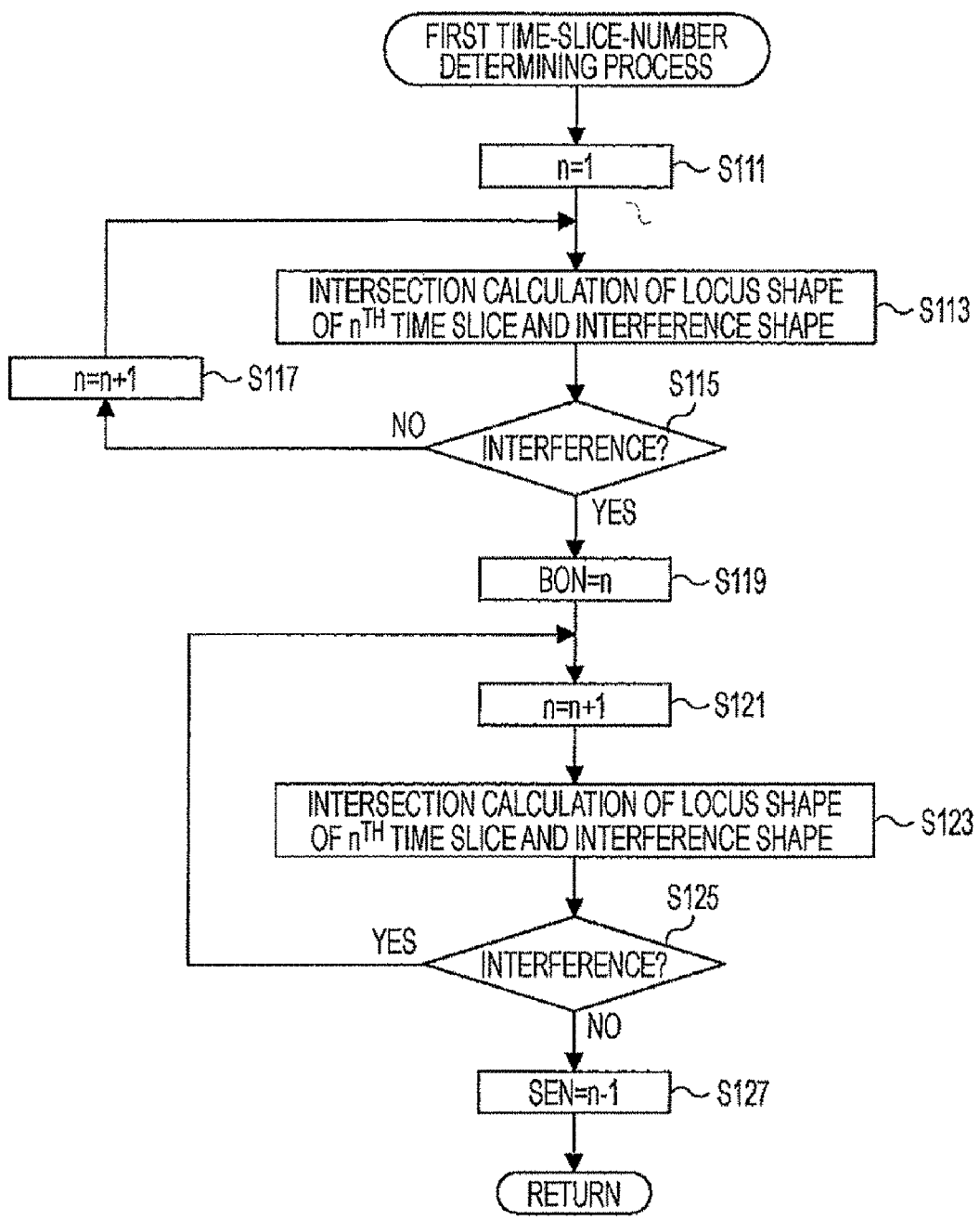
FIG. 15 is a flowchart illustrating a first time-slice-number determining process.

Then, n is incremented by 1 in operation S121 and the model data of the locus shape corresponding to the $n^{th}$ time slice is read from the locus data storage 5. Then, an intersection calculation of the locus shape corresponding to the $n^{th}$ time slice and the interference shape is performed in operation S123. This calculation is similar to that performed in operation S113 (FIG. 15). If there is an interference (YES in operation S125), the process returns to operation S121. If there is no interference (NO in operation S125), n−1 is set as a parameter SEN in operation S127. Thus, the time at which the robot arm returns to the position of the interference shape is determined and is set as a parameter SEN. Then, the process returns to the original process.

Figure 16:
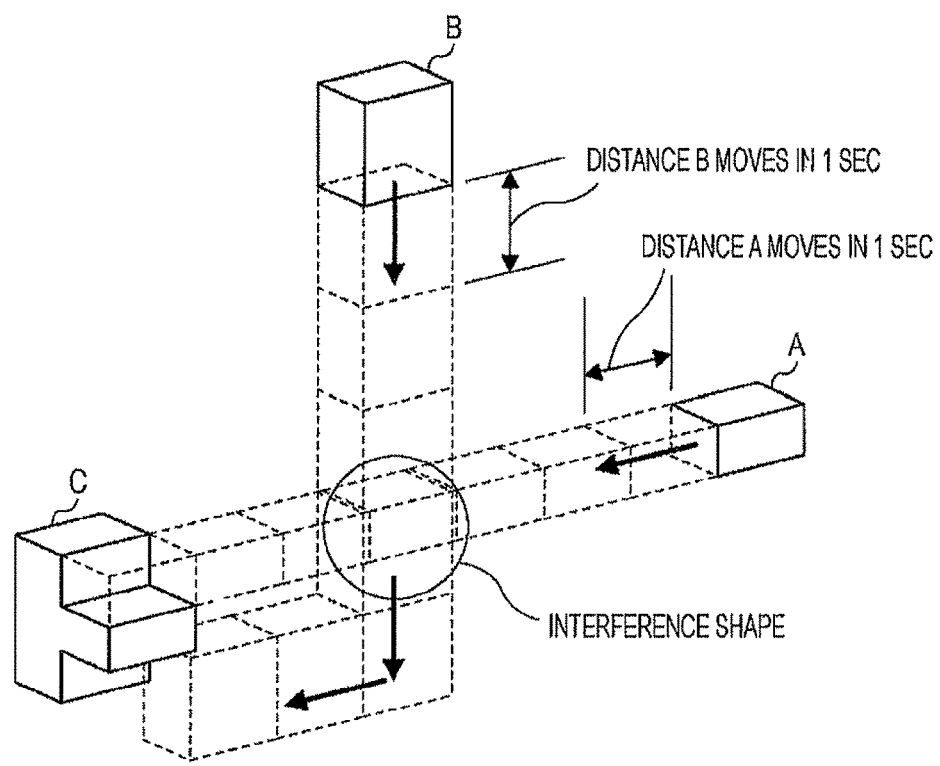
FIG. 16 is a diagram illustrating a move-start-time changing process.

The above-described process will be explained in detail with reference to FIGS. 16 and 17. FIG. 16 is a schematic diagram illustrating an operation of assembling a part A and a part B to a part C. Blocks drawn by dotted lines connected to the part A show positions where the part A arrives at in units of one second, and blocks drawn by dotted lines connected to the part B show positions where the part B arrives at in units of one second. In FIG. 16, the part A and the part B both reach a position where they overlap with an interference shape after 4 seconds from start.

Figure 17:
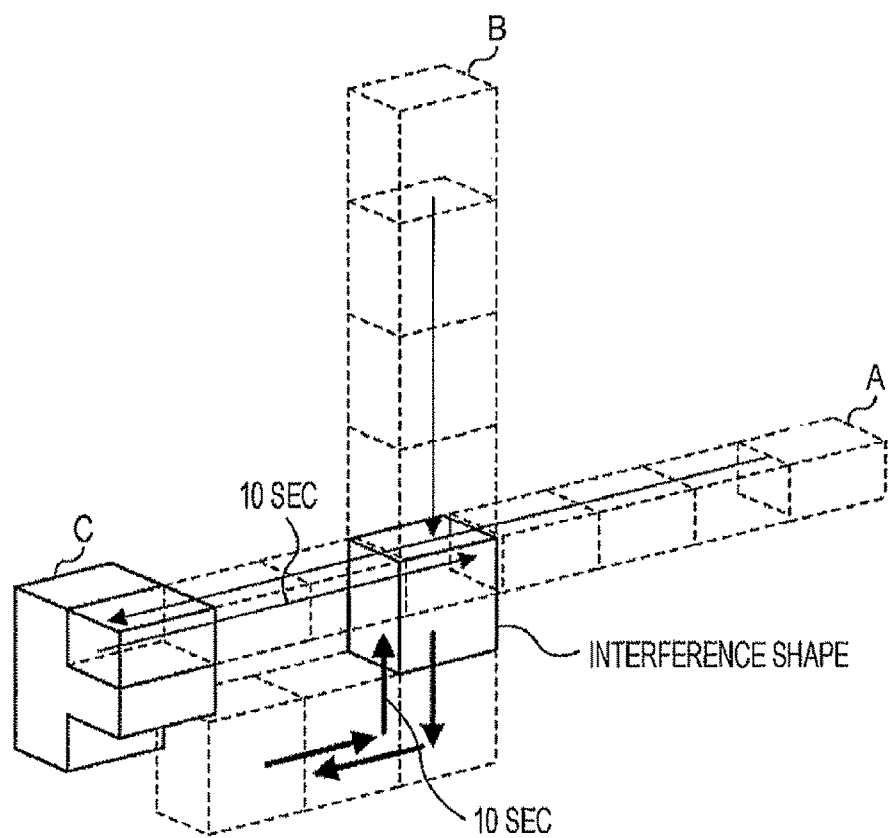
FIG. 17 is a diagram illustrating a move-start-time changing process.

In addition, as shown in FIG. 17, it takes 10 seconds for a robot arm used for assembling the part A to return to the position of the interference shape, and 11 seconds to reach a position where no interference occurs with the interference shape. Similarly, it takes 10 seconds for a robot arm used for assembling the part B to return to the position of the interference shape, and 11 seconds to reach a position where no interference occurs with the interference shape.

Accordingly, for both of the part A and the part B, SEN is set to 10 and BON is set to 4.

Referring to FIG. 14 again, the move-start-time adjuster 11 carries out the first time-slice-number determining process for a second part in operation S105. The first time-slice-number determining process performed in operation S105 is similar to that shown in FIG. 15. Then, a second time-slice-number determining process is performed in operation S107. The second time-slice-number determining process will be described with reference to FIG. 18.

Figure 18:
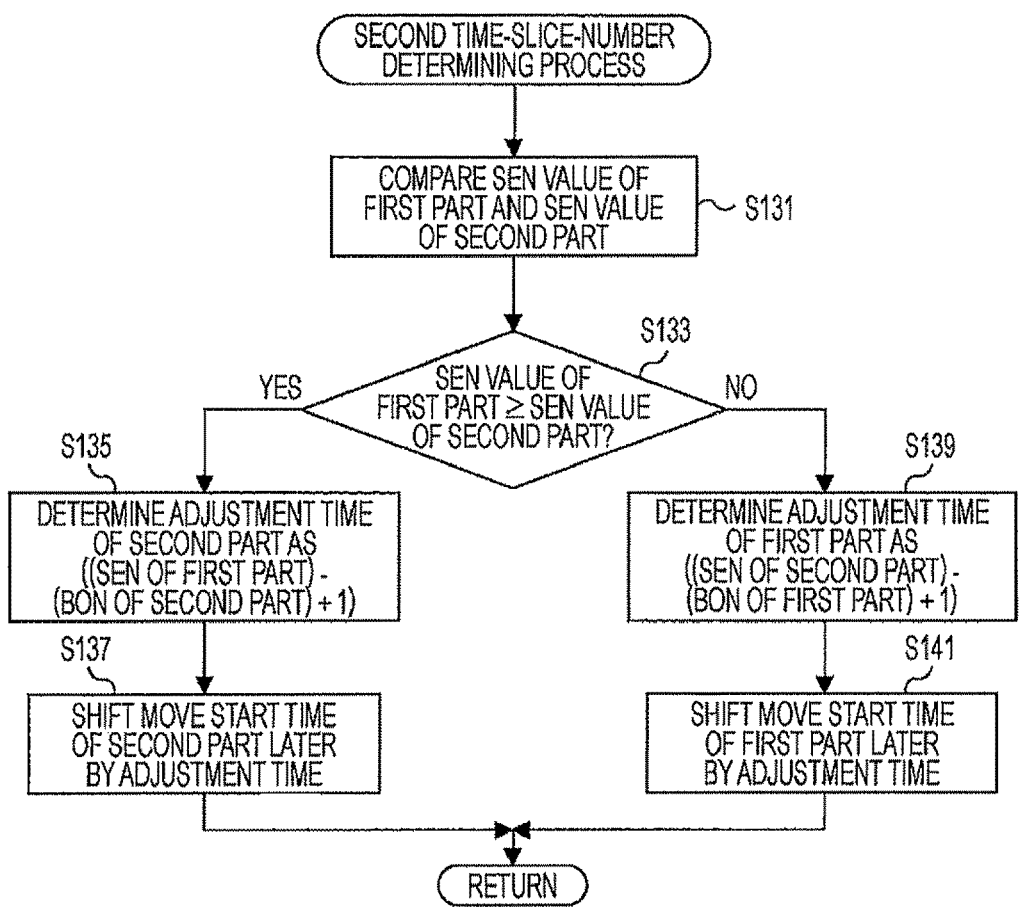
FIG. 18 is a flowchart illustrating a second time-slice-number determining process.

As shown in FIG. 18, in operation S131, the move-start-time adjuster 11 compares a value of SEN of the first part and a value of the second part. If (SEN of first part)≧(SEN of second part) is satisfied (YES in operation S133), ((SEN of first part)−(BON of second part)+1) is determined as an adjustment time for the second part in operation S135. Then, the move start time of the second part and the arrival times of the locus shapes thereof that are registered in the locus data storage 5 are shifted later by the adjustment time in operation S137. Then, the process returns to the original process.

If (SEN of first part)≧(SEN of second part) is not satisfied (NO in operation S133), ((SEN of second part)−(BON of first part)+1) is determined as an adjustment time for the first part in operation S139. Then, the move start time of the first part and the arrival times of the locus shapes thereof that are registered in the locus data storage 5 are shifted later by the adjustment time in operation S141. Then, the process returns to the original process.

According to the above-described process, a part whose move start time is to be shifted later and a time by which the move start time is to be shifted to assemble the parts most quickly without interference can be determined.

In the example shown in FIGS. 16 and 17, the value of SEN of the part A is equal to that of the part B. Therefore, the move start time of either of the part A and the part B may be changed. The adjustment time by which the move start time is to be shifted later is calculated form the above equation as (10−4+1)=7 seconds.

Referring to FIG. 14 again, the move-start-time adjuster 11 causes the data input/output unit 15 to show a display indicating the part name of the part whose move start time is to be changed and the adjustment time (or the move start time after the adjustment) to the user in operation S109.

Thus, the move-start-time changing process for the part that causes interference is finished. Accordingly, referring to FIG. 3B again, the moving locus generator 3 causes the data input/output unit 15 to show a display prompting the user to input an instruction of whether or not to allow a result of the move-start-time changing process. Then, the moving locus generator 3 receives the instruction of whether or not to allow the result from the data input/output unit 15. If the result of the move-start-time changing process is not allowable (NO in operation S75), the process proceeds to operation S71. In other words, the locus data is corrected.

If the result of the move-start-time changing process is allowable (YES in operation S75), the process proceeds to operation S77.

In operation S77, it is determined whether or not an instruction to return to operation S1 (FIG. 3A) for selecting an additional part to be analyzed is input by the user. If such an instruction is input, the process returns to operation S1 through terminal C. In other cases, the process is finished.

Thus, an occurrence/absence of an interference is checked. In addition, if there is an interference, the locus data is corrected until the interference is eliminated or the move start time is suitably adjusted to avoid the interference.

The above-described processes are performed by, for example, a single user for parts handled by the user.

Figure 19:
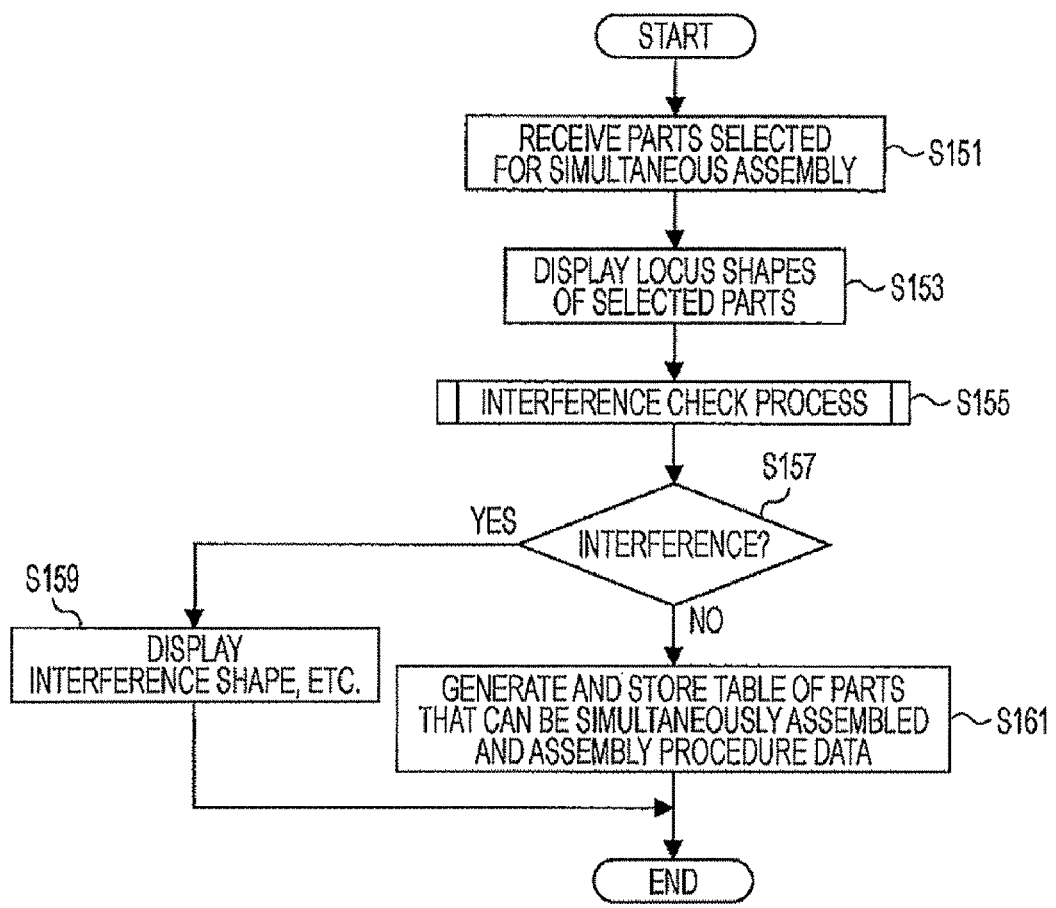
FIG. 19 is a flowchart illustrating a process for verifying parts to be simultaneously assembled.

Next, a process for checking interference between parts handled by a plurality of users will be described with reference to FIGS. 19 and 20. The assembly procedure generator 7 causes the data input/output unit 15 to display the parts registered in the locus data storage 5 and prompts the user to select parts to be simultaneously assembled. The user selects parts handled by a plurality of users. In operation S151, the assembly procedure generator 7 receives the selection input indicating the parts to be simultaneously assembled from the user through the data input/output unit 15. The assembly procedure generator 7 reads the locus model data of the parts to be simultaneously assembled from the locus data storage 5, and causes the data input/output unit 15 to display the locus model data to the user in operation S153. Then, the interference check process is performed for the parts to be simultaneously assembled in operation S155. The interference check process is similar to that described above with reference to FIG. 11, and explanations thereof are thus omitted here.

Then, if it is determined that there is an interference (YES in operation S157) as a result of the process performed in operation S155, the assembly procedure generator 7 outputs the interference shape, the interference shape name, etc., which are obtained as a result of the interference check process, through the data input/output unit 15 in operation S159. Then, the process is finished. The user checks the locus data to be changed and the like from the interference shape and the interference shape name, and performs a suitable operation. Then, the process is performed again.

If it is determined that there is no interference (NO in operation S157) as a result of the process performed in operation S155, a table of parts that can be simultaneously assembled and assembly procedure data are generated using the names of the parts selected for simultaneous assembly and move start times of the parts selected for simultaneous assembly that are stored in the locus data storage 5. The table and the assembly procedure data are stored in the assembly procedure data storage 9 and are displayed to the user by the data input/output unit 15 in operation S161.

For example, data tables shown in FIGS. 20A and 20B are generated and stored in the assembly procedure data storage 9. FIG. 20A shows a table of parts that can be simultaneously assembled. In this example, four parts can be simultaneously assembled. FIG. 20B shows an assembly procedure including a move start times, numbers indicating an order of assembly, and the part names of the four parts. The order of assembly is determined on the basis of the move start time. That is, a number is assigned in ascending order from the parts having the earliest move start times. In the example shown in FIG. 20B, the move start time of the part having the part name XX2 is adjusted in the move-start-time changing process (FIG. 14). Therefore, the number indicating the order of assembly of the part having the part name XX2 is set to "2".

If the above-described data is generated, parts handled by a plurality of users can also be simultaneously assembled. In addition, if it is determined that there is an interference, a part to be subjected to a process of changing, for example, the locus data thereof can be determined between the users.

According to the above-described processes, it can be easily determined whether or not it is possible to simultaneously assemble a plurality of parts before starting an actual assembly process. Therefore, manufacturing cost and a process time required before starting the manufacturing operation can be reduced.

In addition, instead of simply starting the assembly of the parts at the same time, the move start times of the parts can be individually adjusted. Therefore, a number of parts that can be simultaneously assembled can be increased.

Although an embodiment of the present invention has been described above, the functional block shown in FIG. 1 is simply an example, and does not necessarily match the program module structure.

In addition, in the process flows, the operations can be performed in different orders or in parallel as long as similar process results can be obtained.

According to an embodiment, in the process of generating a locus shape, a rotation angle is fixed to 360° for every rotation around a rotational axis. However, in such a case, a size of the locus shape is increased, and accordingly an occurrence of interference is also increased. In addition, according to an embodiment, there may be a case in which a sphere, instead of a column, is set for a rotation around a rotational axis in the process of generating the locus shape, as shown in FIG. 10. Accordingly, as a modification of the above-discussed embodiment, a process flow described below is carried out to suppress the occurrence of interference by setting a rotational angle for rotation around a rotational axis to reduce a size of the locus shape.

Figure 5:
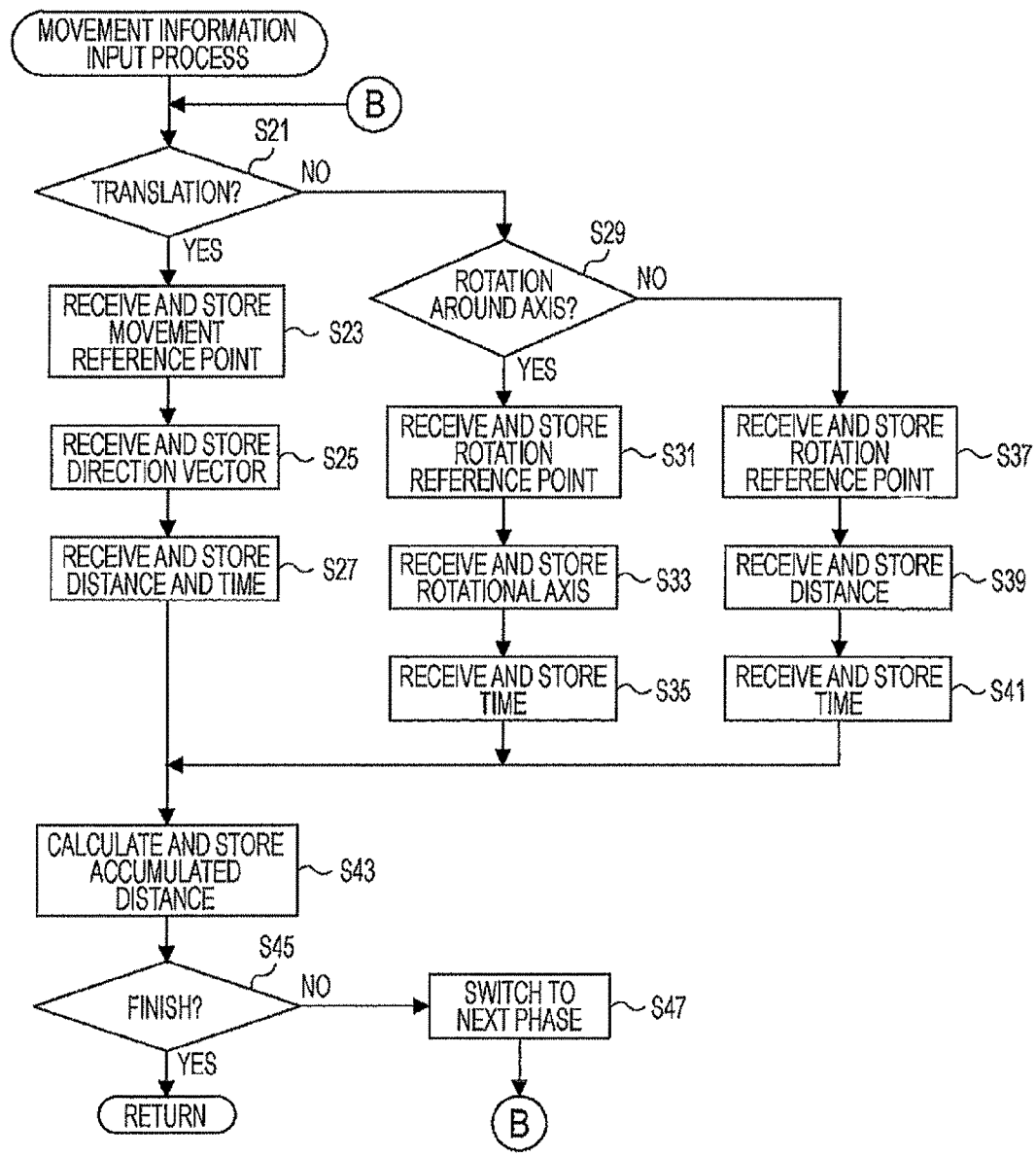
FIG. 5 is a flowchart illustrating a movement-information input process.
Figure 21:
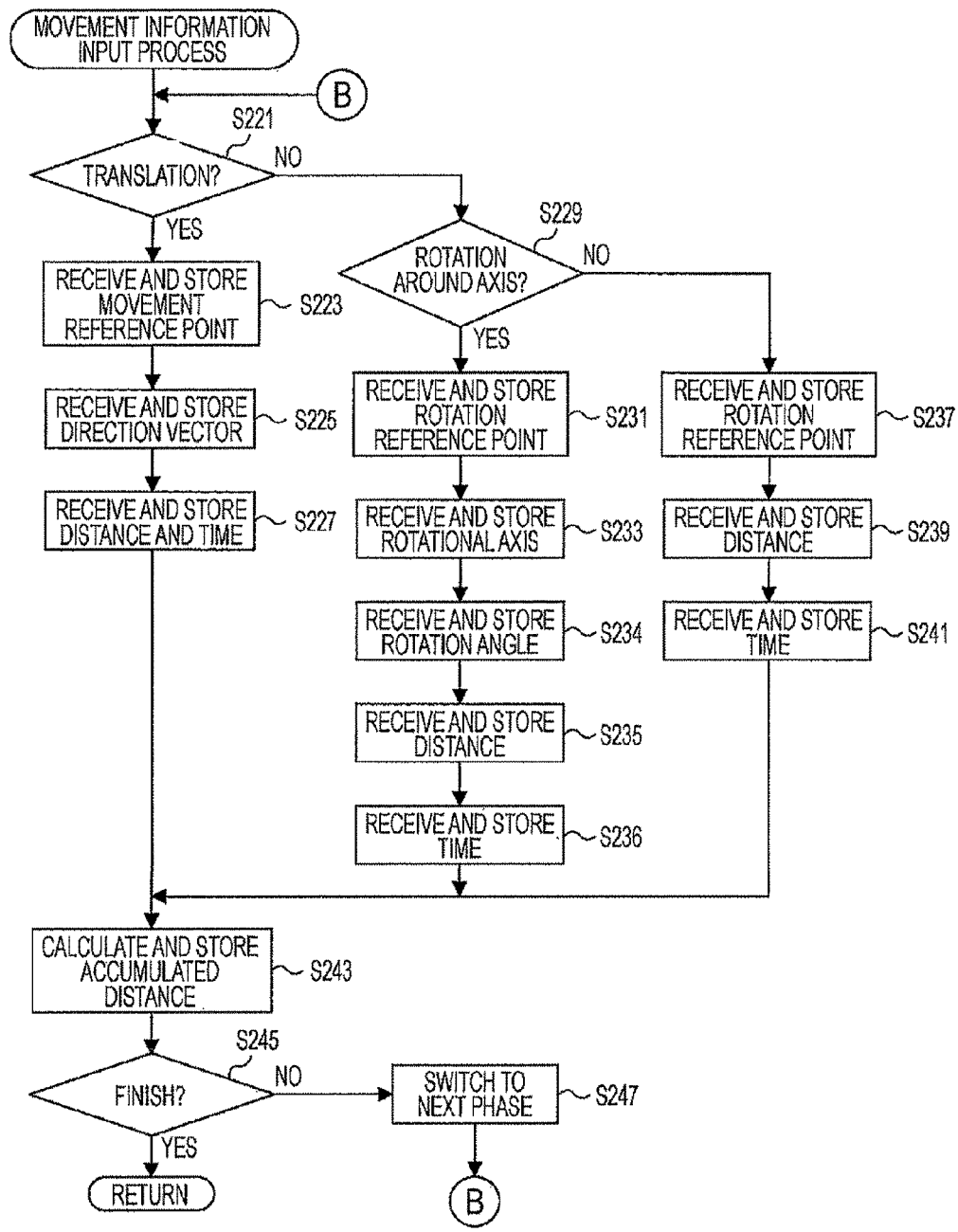
FIG. 21 is a flowchart illustrating a movement-information input process according to a modification.

More specifically, a process flow shown in FIG. 21 is performed instead of the process flow shown in FIG. 5. The process flow shown in FIG. 21 differs from the process flow shown in FIG. 5 in that operations S234 and S235 are added for rotation around an axis. More specifically, the moving locus generator 3 causes the data input/output unit 15 to show a display prompting the user to input a rotation angle. A rotation angle input by the user is received and stored in the locus data storage 5 in operation S234. Then, the moving locus generator 3 causes the data input/output unit 15 to show a display prompting the user to input a distance. A distance input by the user is received and stored in the locus data storage 5 in operation S235. Since operations S221, S223, S225 and S227; S229, S231 and S233; and S237, S239 and S241 (of FIG. 21) correspond to operations S21, S23, S25 and S27; S29, S31 and S33; and S37, S39 and S41 (of FIG. 5), descriptions thereof are omitted.

Figure 22:
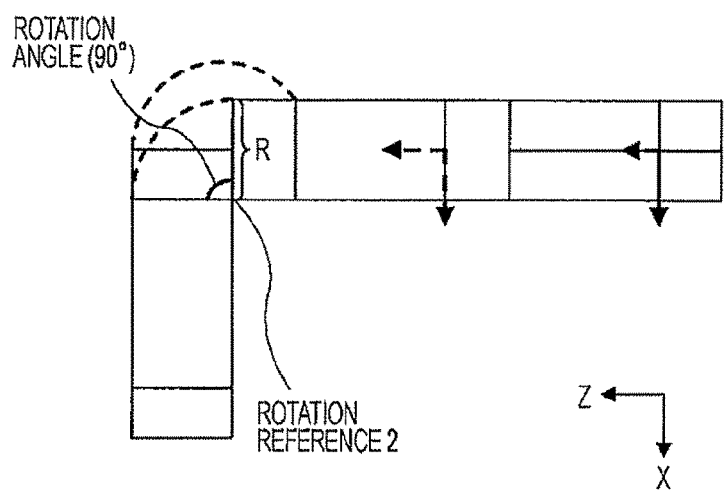
FIG. 22 is a top view illustrating a locus shape according to a modification.
Figure 23:
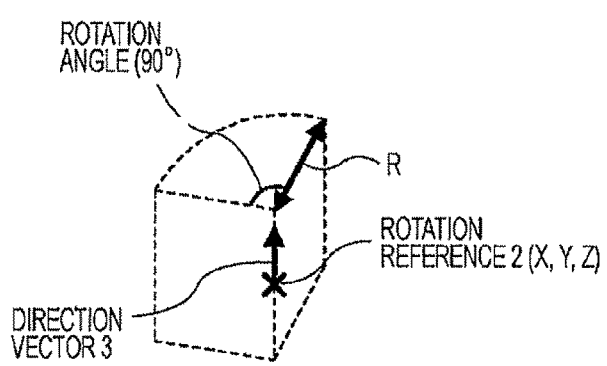
FIG. 23 is a perspective view illustrating a locus shape according to a modification.

When the process shown in FIG. 21 is performed to input a locus shown in FIGS. 22 and 23 instead of the locus shown in FIG. 10, data shown in FIG. 24 is stored in the locus data storage 5. Similar to FIG. 10, FIG. 22 shows a moving locus viewed in the Y-axis direction. A rotating body obtained as a result of rotation around a rotational axis (direction vector 3) that passes through the rotation reference 2 by 90° is used as the locus shape. FIG. 23 is a perspective view illustrating the rotation. In the an embodiment, the locus data is input in operations S37 to S41 in the process flow shown in FIG. 5. In comparison, in this modification, the locus data is input in operations S231 to S236.

In this modification, the data stored in the locus data storage 5 differs from that of the above-discussed embodiment in that the rotation angle is set to 360° in phase 2, as shown in FIG. 24. Although an accurate rotation angle can also be input, a column can be assumed as a rotating body as in this case. The data also differs in that the direction vector 3 is set as the rotational axis and the rotation angle is set to 90° in phase 4.

Figure 25:
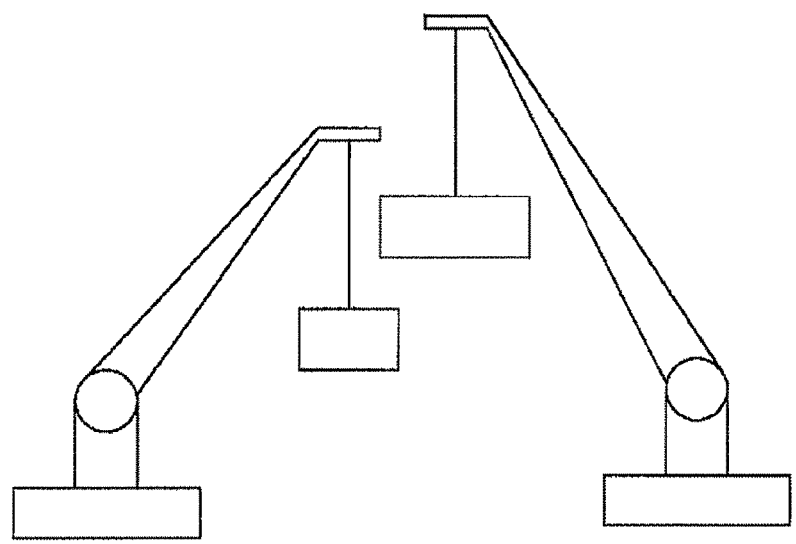
FIG. 25 is a diagram illustrating object(s) to be verified.

Although the assembly of parts is considered, the present invention is not limited to this, and can also be applied to an operation of loading and unloading objects (also called boxes) using a plurality of cranes, as shown in FIG. 25.

Figure 26:
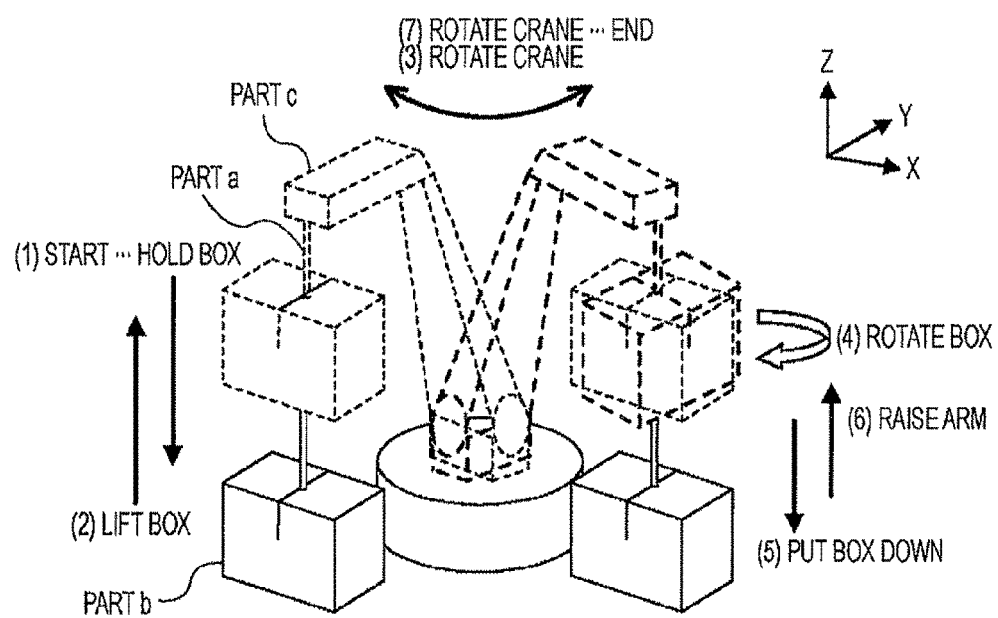
FIG. 26 is a schematic diagram illustrating moving loci of object(s)

For example, a process shown in FIG. 21 can be performed to input data of a moving locus of a box moved by a crane as shown in FIG. 26. In an embodiment, it is only necessary to input data of the moving locus of the part to be assembled. However, according to another embodiment, it may be necessary to input locus data of a plurality of parts including portions of the crane and the box. More specifically, locus shapes are generated by inputting data of moving loci of an arm a for holding the box, the box b, and a crane head c. In the example shown in FIG. 26, the following operations are performed: that is, (1) the arm a is lowered to hold the box, (2) the box b is lifted, (3) the crane is rotated, (4) the box b is rotated, (5) the box b is put down, (6) the arm a is raised, and (7) the crane is rotated back to the original position.

Figure 27A:
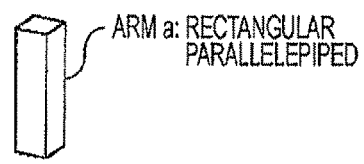
FIG. 27A is a schematic diagram illustrating a shape of an arm.
Figure 27B:
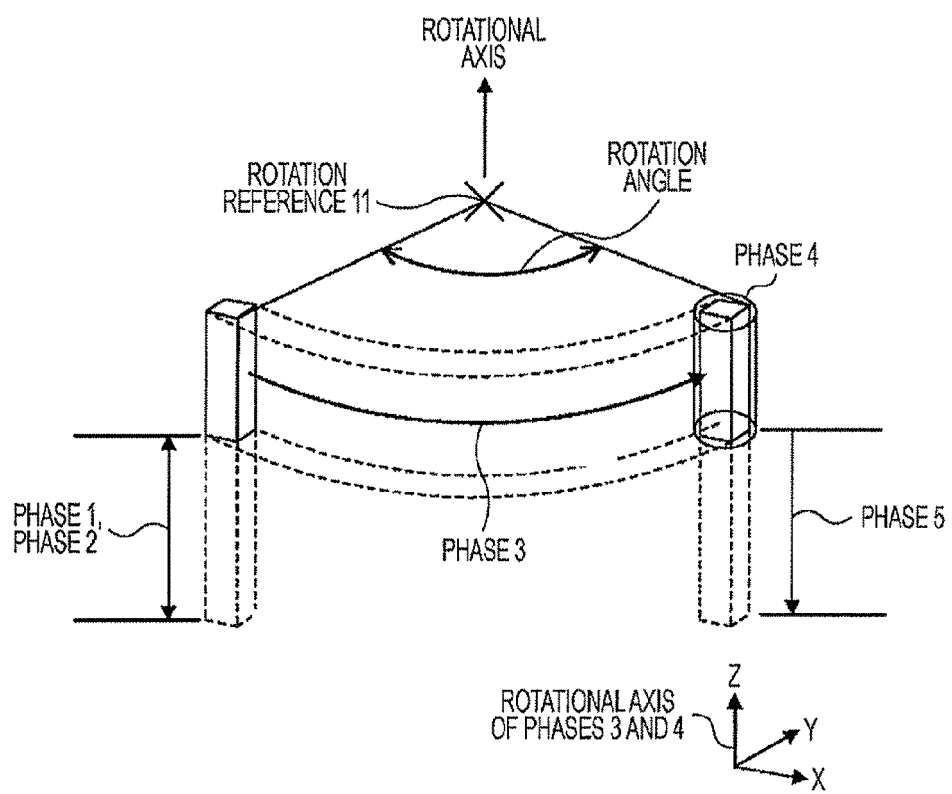
FIG. 27B is a schematic diagram illustrating a moving locus of an arm.

The data of moving loci of the three objects and the locus shapes thereof will be described with reference to FIGS. 27 to 33. As shown in FIG. 27A, the arm a is approximated as a rectangular parallelepiped with a predetermined size. As shown in FIG. 27B, the arm a is lowered to the box b in phase 1, is moved upward in phase 2, is rotated by a predetermined rotation angle (90° in this example) around a rotation reference 11 and a rotational axis (Z axis, direction vector 13) in phase 3, is rotated by a predetermined rotation angle (360° in this example) around a rotation reference 12 and a rotational axis (Z axis, direction vector 13) in phase 4, and is lowered until the box b reaches the ground in phase 5. Although not shown in FIG. 27B, the arm a is moved upward in phase 6 as an operation opposite to phase 5, and is rotated by a predetermined rotation angle (−90° in this example) around the rotation reference 11 and the rotational axis (direction vector 13) in phase 7 as an operation opposite to phase 3. In the case of moving and rotating the arm a as described above, data shown in FIG. 28 (only data of phases 1 to 5 is shown) is stored in the locus data storage 5.

Figure 29A:
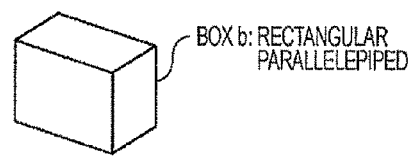
FIG. 29A is a schematic diagram illustrating a shape of a box.
Figure 29B:
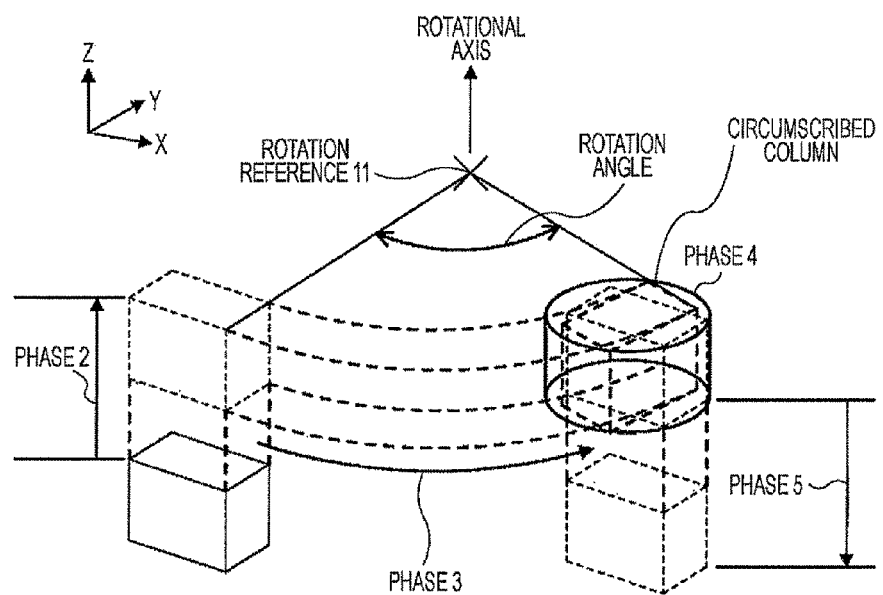
FIG. 29B is a schematic diagram illustrating a moving locus of a box.

As shown in FIG. 29A, the box b is also approximated as a rectangular parallelepiped with a predetermined size. As shown in FIG. 29B, the box b does not move in phase 1. Then, the box is lifted upward in phase 2, is rotated by a predetermined rotation angle (90° in this example) around the rotation reference 11 and the rotational axis (Z axis, direction vector 13) in phase 3, is rotated by a predetermined rotation angle (360° in this example) around the rotation reference 12 and the rotational axis (Z axis, direction vector 13) in phase 4, and is lowered to the ground in phase 5. In phase 4, as shown in FIG. 29B, a circumscribed column is generated as the locus shape since the box b is rotated by 360°. In the case of moving and rotating the box b as described above, data shown in FIG. 30 is stored in the locus data storage 5.

Figure 31A:
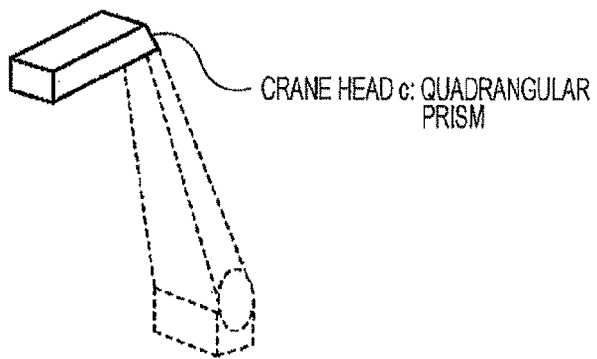
FIG. 31A is a schematic diagram illustrating a shape of a crane head.
Figure 31B:
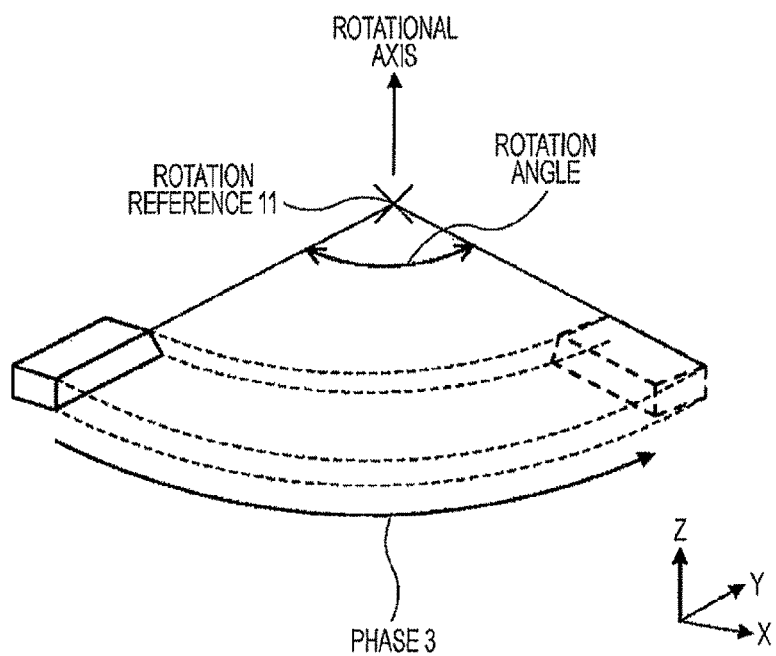
FIG. 31B is a schematic diagram illustrating a moving locus of a crane head.

As shown in FIG. 31A, the crane head c is approximated as a quadrangular prism with a predetermined size. As shown in FIG. 31B, the crane head c does not move in phases 1 and 2. Then, the crane head c is rotated by a predetermined rotation angle (90° in this example) around the rotation reference 11 and the rotational axis (Z axis, direction vector 13) in phase 3. Then, the crane head c does not move in phases 4 and 5. Although not shown in FIG. 31B, the crane head c is rotated by a predetermined rotation angle (−90° in this example) around the rotation reference 11 and the rotational axis (direction vector 13) in phase 7 as an operation opposite to phase 3. In the case of rotating the crane head c as described above, data shown in FIG. 32 (only data of phases 1 to 5 is shown) is stored in the locus data storage 5.

Figure 33:
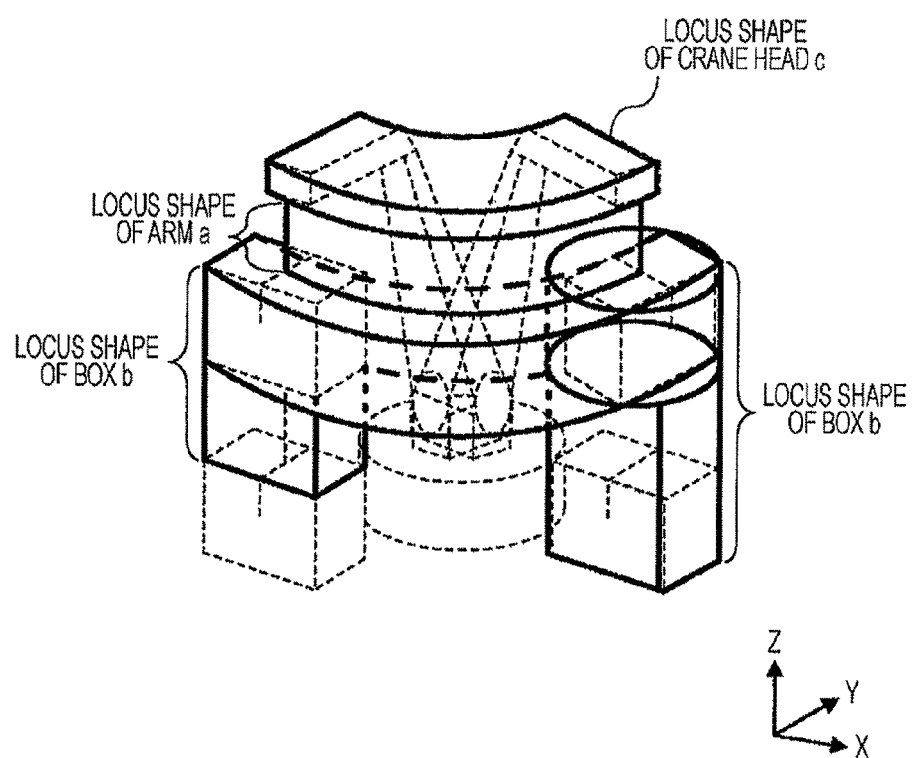
FIG. 33 is a schematic diagram illustrating a locus shape of an overall body.

Then, the moving locus generator 3 generates the locus shapes of the three objects using data stored in the locus data storage 5. FIG. 33 shows a model of the generated locus shapes. In FIG. 33, a shape shown by bold lines shows a sum of the three locus shapes. A portion of the locus shape of the arm a cannot be viewed from the outside because the locus shape of the arm a overlaps the locus shape of the box b.

Thus, in the case of loading and unloading objects with cranes, a plurality of locus shapes are generated for a plurality of components. Other processes are similar to those in the embodiment described above and the modification thereof.

In addition to the case of loading and unloading objects with cranes, the present invention can also be applied to cases in which a plurality of objects are simultaneously moved close to each other.

Figure 34:
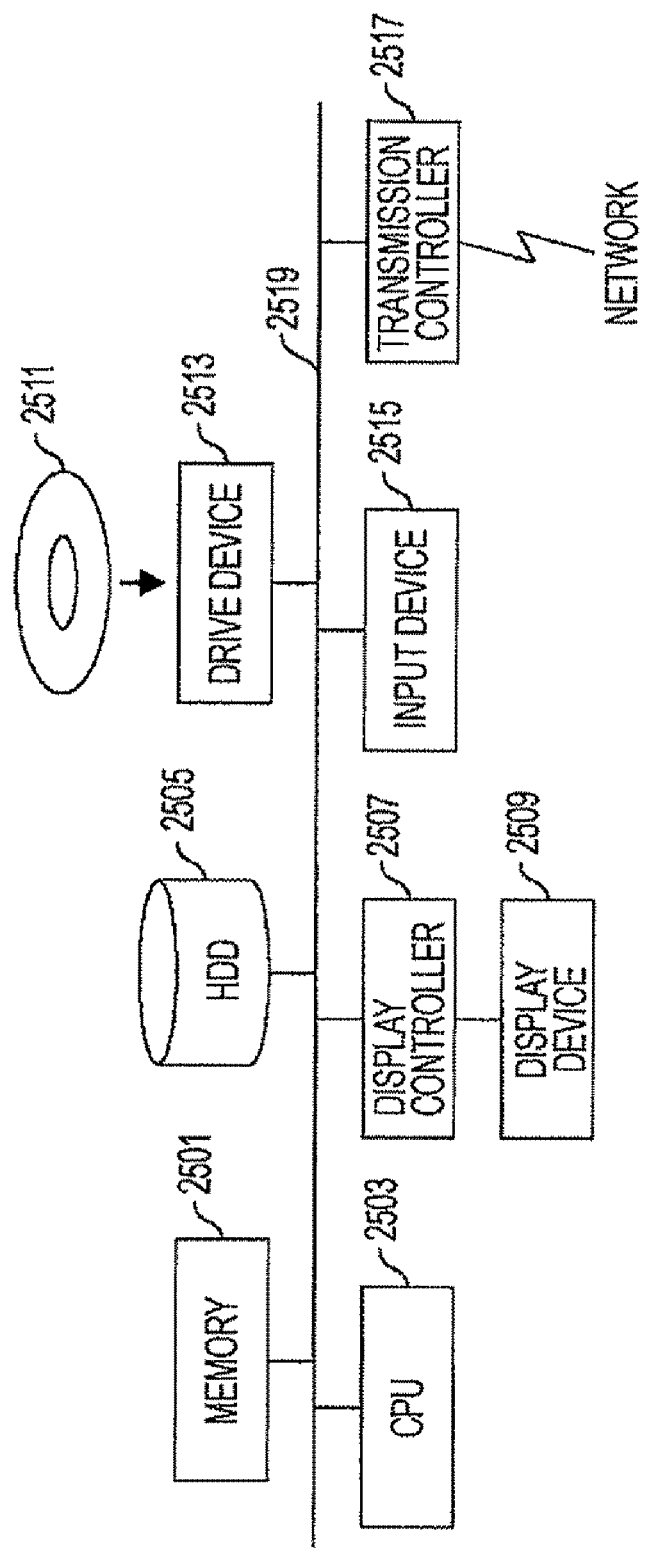
FIG. 34 is a functional block diagram of a computer.

The assembly verification apparatus is, for example, a computer. As shown in FIG. 34, the computer includes a memory 2501 (a storage device), a central processing unit (CPU) 2503 (a processing unit), a hard disk drive (HDD) 2505, a display controller 2507 connected to a display 2509, a drive 2513 for a removable disk 2511, an input unit 2515, and a communication controller 2517 for providing connection to a network. These components are connected to each other via a bus 2519. An operating system (OS) and application programs including a Web browser may be stored in the HDD 2505, and loaded from the HDD 2505 into the memory 2501 when executed by the CPU 2503. The display controller 2507, the communication controller 2517, and the drive 2513 perform necessary operation(s) under the control of the CPU 2503. During the operation(s), data is stored in the memory 2501, and in the HDD 2505 as necessary. The computer configured as described above achieves the various functions described earlier through effective cooperation of the hardware such as the CPU 2503 and the memory 2501, the OS, and needed application programs.

The computer that functions as the assembly verification apparatus may be a stand-along computer, or be included in a client-server system.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A non-transitory computer-readable recording medium storing a locus-interference verification program for causing a computer to execute operations, comprising:
    accepting an input of data regarding loci generated when a plurality of objects to be analyzed are moved or rotated and storing said data in a locus data storage;
    generating locus models corresponding to said objects and storing said locus models in a locus model data storage, each locus model representing a locus of at least a position where a maximum size is obtained and being generated by virtually moving model data of a corresponding object in accordance with data regarding said locus of said corresponding object, said data regarding said locus being stored in said locus data storage and said model data being stored in a model data storage for each of said objects; and
    performing an intersection calculation for all of combinations of said locus models stored in said locus model data storage, and determining an occurrence of an overlapping model between said locus models based on said intersection calculation, where said overlapping model indicates an occurrence of an interference during a movement or a rotation of said objects, and
    wherein said generating locus models includes generating locus data groups for said objects and storing said locus data groups in said locus model data storage, each locus data group including locus models of a time unit and being generated by virtually moving said model data of said corresponding object in said time unit in accordance with said data regarding said locus, and
    wherein said computer executes:
        determining, when said overlapping model is present between said locus models, a first object and a second object corresponding to said locus models between which said overlapping model is present;
        determining an interference start time at which said interference with said overlapping model starts and an interference end time at which said interference with said overlapping model ends for each of said first object and said second object using said locus model groups of said first object and said second object; and
        calculating an adjustment time for a move start time of one of said first object and said second object based on said interference start times and said interference end times of said first object and said second object.

2. The computer-readable recording medium according to claim 1, comprising:
    issuing a warning when said determining indicates said overlapping model is present between said locus models.

3. The computer-readable recording medium according to claim 1, wherein said calculating of said adjustment time includes determining said interference start time and said interference end time of said first object by performing an intersection calculation for said locus model group of said first object and said overlapping model; and
    determining said interference start time and said interference end time of said second object by performing an intersection calculation for said locus model group of said second object and said overlapping model.

4. The computer-readable recording medium according to claim 1, wherein said calculating of said adjustment time includes determining which of said first object and said second object has an earlier interference end time; and
    calculating said adjustment time for one of said first object and said second object having a later interference end time by subtracting said later interference end time from said earlier interference end time and adding a time unit.

5. A locus-interference verification method, comprising:
    accepting an input of data regarding loci generated when a plurality of objects to be analyzed are moved or rotated and storing said data in a locus data storage;
    generating locus models corresponding to said objects and storing said locus models in a locus model data storage, each locus model representing a locus of at least a position where a maximum size is obtained and being generated by virtually moving model data of a corresponding object in accordance with data regarding said locus of said corresponding object, said data regarding said locus being stored in said locus data storage and said model data being stored in a model data storage for each of said objects; and
    performing an intersection calculation for all of said combinations of said locus models stored in said locus model data storage, and determining an occurrence of an overlapping model between said locus models based on said intersection calculation, where said overlapping model indicates an occurrence of an interference during a movement or a rotation of said objects, and
    wherein said generating locus models includes generating locus data groups for said objects and storing said locus data groups in said locus model data storage, each locus data group including locus models of a time unit and being generated by virtually moving said model data of said corresponding object in said time unit in accordance with said data regarding said locus, and wherein said computer executes:
determining, when said overlapping model is present between said locus models, a first object and a second object corresponding to said locus models between which said overlapping model is present;
determining an interference start time at which said interference with said overlapping model starts and an interference end time at which said interference with said overlapping model ends for each of said first object and said second object using said locus model groups of said first object and said second object; and
calculating an adjustment time for a move start time of one of said first object and said second object based on said interference start times and said interference end times of said first object and said second object.

6. A locus-interference verification apparatus, comprising:
an input unit accepting an input of data regarding loci generated when a plurality of objects to be analyzed are moved or rotated and storing said data in a locus data storage;
a moving locus generator generating locus models corresponding to said objects and storing said locus models in a locus model data storage, each locus model representing a locus of at least a position where a maximum size is obtained and being generated by virtually moving model data of a corresponding object in accordance with data regarding said locus of said corresponding object, said data regarding said locus being stored in said locus data storage and said model data being stored in a model data storage for each of said objects; and
an interference checker performing an intersection calculation for all of said combinations of said locus models stored in said locus model data storage, and determining an occurrence of an overlapping model between said locus models based on said intersection calculation, where said overlapping model indicates an occurrence of interference during a movement or a rotation of said objects, and
wherein said locus-model generating unit generates locus data groups for said objects and stores said locus data groups in said locus model data storage, each locus data group including locus models of a time unit and being generated by virtually moving said model data of said corresponding object of said time unit in accordance with said data regarding said locus, and wherein said locus-interference verification apparatus executes operations including:
determining, when said overlapping model is present between said locus models, a first object and a second object corresponding to said locus models between which said overlapping model is present;
determining an interference start time at which said interference with said overlapping model starts and an interference end time at which said interference with said overlapping model ends for each of said first object and said second object by performing an intersection calculation for said locus model group of each of said first object and said second object and said overlapping model;
calculating an adjustment time for a move start time of one of said first object and said second object based on said interference start times and said interference end times of said first object and said second object.

7. The locus-interference verification apparatus according to claim 6, wherein a warning is issued when determining that said overlapping model is present between said locus models.

8. The locus-interference verification apparatus according to claim 6, wherein said interference start time and said interference end time of said first object is determined by performing an intersection calculation for said locus model group of said first object and said overlapping model, and said interference start time and said interference end time of said second object is determined by performing an intersection calculation for said locus model group of said second object and said overlapping model.

9. The locus-interference verification apparatus according to claim 6, wherein said calculating adjustment time includes determining which of said first object and said second object has an earlier interference end time; and calculating said adjustment time for one of said first object and said second object having a later interference end time by subtracting said later interference end time from said earlier interference end time and adding a time unit.

* * * * *